United States Patent
Hasegawa

(10) Patent No.: US 8,041,110 B2
(45) Date of Patent: Oct. 18, 2011

(54) PIXEL INTERPOLATION METHOD

(75) Inventor: Hiromu Hasegawa, Osaka (JP)

(73) Assignee: MegaChips Corporation, Osaka-shi (JP)

( * ) Notice: Subject to any disclaimer, the term of this patent is extended or adjusted under 35 U.S.C. 154(b) by 546 days.

(21) Appl. No.: 12/269,354

(22) Filed: Nov. 12, 2008

(65) Prior Publication Data
US 2009/0136153 A1 May 28, 2009

(30) Foreign Application Priority Data
Nov. 27, 2007 (JP) ................................. 2007-305347

(51) Int. Cl.
*G06K 9/00* (2006.01)

(52) U.S. Cl. ........ 382/167; 382/162; 382/278; 382/300; 358/525; 348/538

(58) Field of Classification Search .................. 382/162, 382/166, 167, 274, 278, 299, 300, 232; 358/525; 358/428; 348/223.1, 273, 294, 315, 449, 348/451, 538
See application file for complete search history.

(56) References Cited

U.S. PATENT DOCUMENTS

| | | | | |
|---|---|---|---|---|
| 6,853,748 B2 * | 2/2005 | Endo et al. | ................. | 382/167 |
| 7,339,619 B2 * | 3/2008 | Tsuruoka | ................. | 348/234 |
| 7,916,937 B2 * | 3/2011 | Utsugi et al. | ................. | 382/162 |
| 2002/0041332 A1 * | 4/2002 | Murata et al. | ................. | 348/272 |
| 2004/0218075 A1 * | 11/2004 | Tsuruoka | ................. | 348/272 |
| 2006/0114526 A1 | 6/2006 | Hasegawa | | |
| 2007/0116375 A1 * | 5/2007 | Utsugi et al. | ................. | 382/264 |
| 2007/0126885 A1 | 6/2007 | Hasegawa | | |
| 2007/0280539 A1 | 12/2007 | Hasegawa et al. | | |
| 2010/0085449 A1 * | 4/2010 | Nonaka et al. | ................. | 348/242 |

FOREIGN PATENT DOCUMENTS

JP 2006-186965 7/2006

* cited by examiner

*Primary Examiner* — Samir Ahmed
*Assistant Examiner* — Ali Bayat
(74) *Attorney, Agent, or Firm* — Oblon, Spivak, McClelland, Maier & Neustadt, L.L.P.

(57) ABSTRACT

An image processing circuit inputs pixels of an RGB Bayer array therein. A chroma value calculation circuit calculates a chroma factor ($K_L$) for evaluating the chroma of a surrounding area of a specified pixel. A correlation value calculation circuit calculates correlation values for gray image and color image. If the chroma factor ($K_L$) is larger than a threshold value (TH1), a correlation judgment method for color image and a pixel interpolation method for color image are selected, if the chroma factor ($K_L$) is not larger than a threshold value (TH1) and larger than a threshold value (TH2), a correlation judgment method using a correlation value obtained by overall judgment on the correlation values for gray image and color image and a pixel interpolation method for color image are selected, and if the chroma factor ($K_L$) is not larger than a threshold value (TH2), a correlation judgment method for gray image and a pixel interpolation method for gray image are selected.

20 Claims, 15 Drawing Sheets

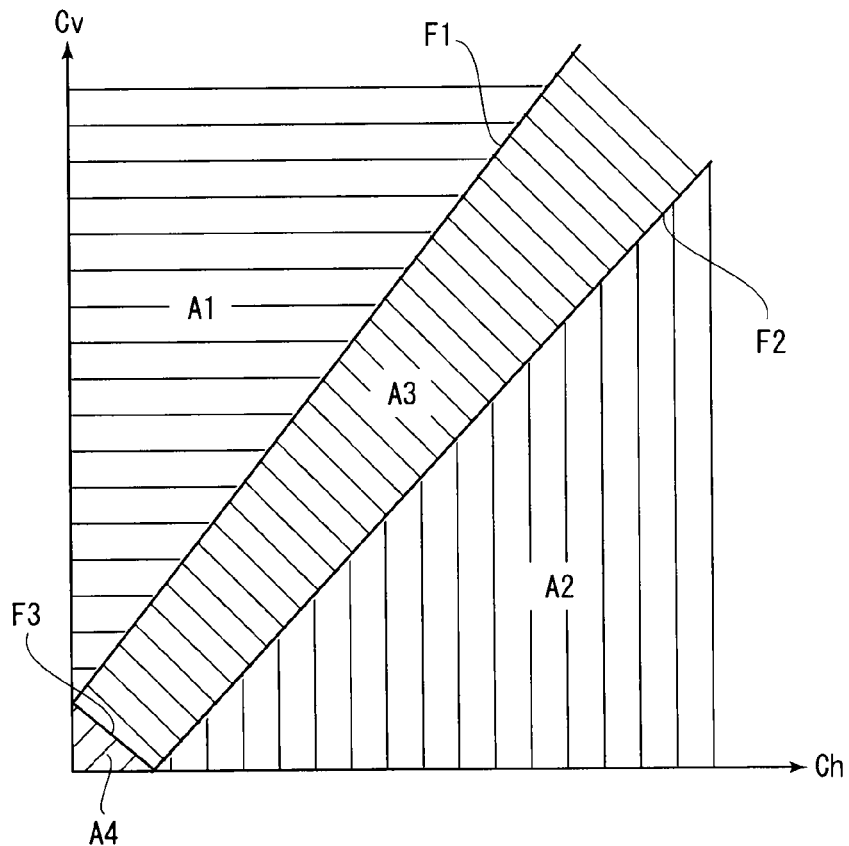

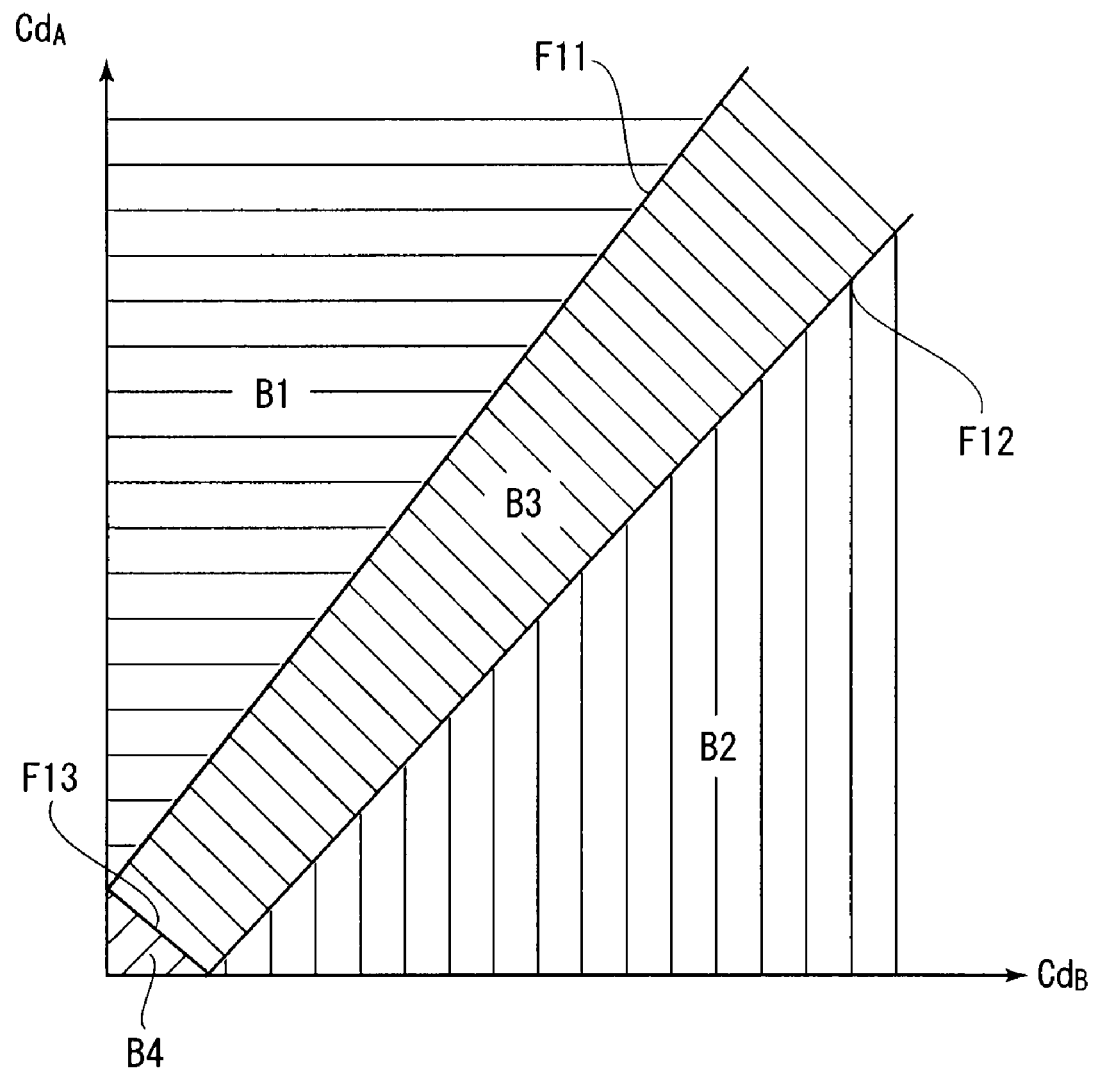

PIXEL INTERPOLATION METHOD

BACKGROUND OF THE INVENTION

1. Field of the Invention

The present invention relates to a technique for pixel interpolation performed by an image processing circuit included in a digital camera or the like.

2. Description of the Background Art

Image pickup elements, such as CCDs, CMOSs and the like which are used in digital cameras and the like, perform photoelectric conversion of light received through color filters, to output pixel signals. Such color filters include RGB color filters, YMCK color filters and the like. Then, from a single-chip image pickup element, a pixel signal for one color is outputted per pixel. For example, in a case of using the RGB color filter, for one pixel, a pixel signal for one of R (Red) component, G (Green) component and B (Blue) component is outputted.

For this reason, as to the pixel signals outputted from the single-chip color image pickup element, an interpolation process has to be performed on pixel signals for other color components. Various algorithms are used to perform such an interpolation process. For example, the degrees of correlation in vertical and horizontal directions are calculated and pixel interpolation is performed by using the pixels in the direction where the degree of correlation is higher. Alternatively, weights are assigned in accordance with the respective distances between the specified pixel and the surrounding pixels and then pixel interpolation is performed.

In Japanese Patent Application Laid Open Gazette No. 2006-186965, a gray area and a color area are discriminated in an image and pixel interpolations in accordance with respective characteristics of these areas are applied to these areas. Especially, there is some contrivance to suppress occurrence of false colors in an area positioned at a boundary between the gray area and the color area. Specifically, the area at the boundary between the gray area and the color area is judged to be a gray image as to the correlation direction and the pixel interpolation for color image is applied thereto.

By using the pixel interpolation method disclosed in Japanese Patent Application Laid Open Gazette No. 2006-186965, it is possible to reduce the false colors caused by the pixel interpolation. In other words, in the area at the boundary between the gray area and the color area, paying attention to that respective pixel values of color components of RGB are approximate to one another, the correlation direction is judged by using pixels closer to the specified pixel, without distinction of RGB. On the other hand, the pixel interpolation is performed with distinction of RGB, to achieve an interpolation result with high precision.

Thus, the reason why such a contrivance for the pixel interpolation has to be performed especially in the area at the boundary between a gray image and a color image is that there is a possibility that the false colors may occur in high-frequency components such as fine lines in a horizontal or vertical direction in this area or the like.

SUMMARY OF THE INVENTION

The present invention is intended for a pixel interpolation method. According to an aspect of the present invention, the pixel interpolation method comprises the steps of (a) inputting a pixel signal of a predetermined color space, (b) calculating a chroma evaluation value of an area consisting of a specified pixel and its surrounding pixels, (c) selecting a correlation judgment method and a pixel interpolation method on the specified pixel on the basis of the chroma evaluation value, and (d) performing a pixel interpolation process on the specified pixel in a correlation direction determined by the selected correlation judgment method, by using the selected pixel interpolation method, and in the present method, by using predetermined two threshold values TH1 and TH2 (TH1≧TH2), if the chroma evaluation value is not larger than the threshold value TH2, a correlation judgment method for gray image and a pixel interpolation method for gray image are selected, if the chroma evaluation value is larger than the threshold value TH2 and not larger than the threshold value TH1, a correlation judgment method using a correlation value selected out of correlation values for gray image and color image and a pixel interpolation method for color image are selected, and if the chroma evaluation value is larger than the threshold value TH1, a correlation judgment method for color image and a pixel interpolation method for color image are selected in the step (c).

By the present invention, it is possible to prevent wrong judgment on the correlation direction and wrong interpolation and reduce false colors occurring in the pixel interpolation process.

According to another aspect of the present invention, the step (c) includes the step of (c-1) selecting a correlation judgment method using a correlation value out of correlation values for gray image and color image, which is judged that the correlation on the specified pixel is reflected higher on, if the chroma evaluation value is larger than the threshold value TH2 and not larger than the threshold value TH1.

It is thereby possible to improve the accuracy in judgment on the correlation direction.

Therefore, it is an object of the present invention to provide a technique to further effectively reduce false colors caused by pixel interpolation in an area at the boundary between a gray image and a color image.

These and other objects, features, aspects and advantages of the present invention will become more apparent from the following detailed description of the present invention when taken in conjunction with the accompanying drawings.

BRIEF DESCRIPTION OF THE DRAWINGS

FIG. 17 is a view showing a criterion of judgment on a correlation judgment method and a pixel interpolation method;

FIG. 18 is a graph showing a correspondence where the correlation is evaluated highly in the vertical and horizontal directions;

FIG. 19 is a graph showing a correspondence where the correlation is evaluated highly in the diagonal A and diagonal B directions;

DESCRIPTION OF THE PREFERRED EMBODIMENTS

Hereinafter, the preferred embodiments of the present invention will be discussed with reference to figures.

The First Preferred Embodiment

<1. Schematic Overall Structure of Digital Camera>

Figure 1:
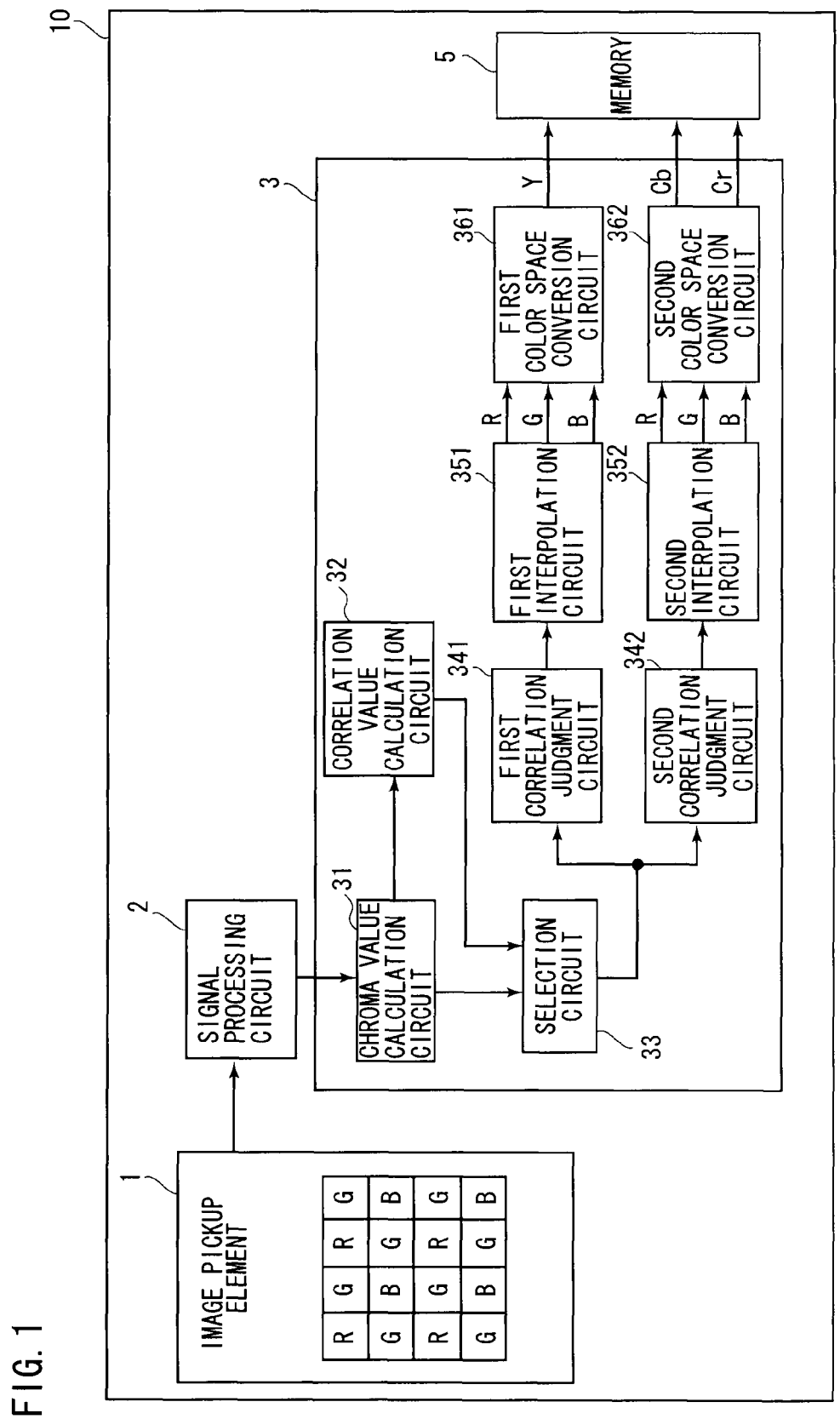
FIG. 1 is a block diagram showing a digital camera in accordance with the preferred embodiments.

FIG. 1 is a block diagram showing a digital camera 10 in accordance with the present invention. The digital camera 10 comprises an image pickup element 1, a signal processing circuit 2, an image processing circuit 3 and a memory 5. The image pickup element 1 is a single-chip CCD comprising a color filter array of RGB Bayer array and outputs a pixel signal of any one of color components of R (Red), G (Green) and B (Blue) from one pixel. Specifically, for example, if G signals and R signals are alternately outputted, such as G→R→G→R . . . , in horizontal lines in odd rows, B signals and G signals are alternately outputted, such as B→G→B→G . . . , in horizontal lines in even rows. Further, as the image pickup element 1, a CMOS sensor may be used.

The pixel signal outputted from the image pickup element 1 is inputted to the signal processing circuit 2. In the signal processing circuit 2, a signal processing such as white balancing, black level correction or the like is performed on the pixel signal. The pixel signal outputted from the signal processing circuit 2 is inputted to the image processing circuit 3. The image processing circuit 3 comprises a chroma value calculation circuit 31, a correlation value calculation circuit 32, a selection circuit 33, first and second correlation judgment circuits 341 and 342, first and second interpolation circuits 351 and 352 and first and second color space conversion circuits 361 and 362.

The chroma value calculation circuit 31 uses the pixel signals of the specified pixel and its surrounding pixels to calculate a chroma value of this area. This chroma value serves as an indicator for judgment on whether the area is a gray image or a color image.

The correlation value calculation circuit 32 uses the pixel signals of the specified pixel and its surrounding pixels to calculate a correlation value of this area.

The selection circuit 33 selects whether an operation for gray image or an operation for color image is to be performed in a correlation judgment process and a pixel interpolation process, on the basis of the chroma value calculated by the chroma value calculation circuit 31.

The first correlation judgment circuit 341 and the second correlation judgment circuit 342 each use the correlation value which is calculated by the correlation value calculation circuit 32 and selected by the selection circuit 33, to judge a correlation direction.

The first interpolation circuit 351 performs the pixel interpolation process on the specified pixel on the basis of the judgment result of the first correlation judgment circuit 341, and the second interpolation circuit 352 performs the pixel interpolation process on the specified pixel on the basis of the judgment result of the second correlation judgment circuit 342.

The first color space conversion circuit 361 performs color space conversion of the pixel signal of RGB interpolated by the first interpolation circuit 351, to generate a Y signal. The second color space conversion circuit 362 performs color space conversion of the pixel signal of RGB interpolated by the second interpolation circuit 352, to generate a Cb signal and a Cr signal.

Further, the chroma value calculation circuit 31, the correlation value calculation circuit 32 and the first and second interpolation circuits 351 and 352 each comprise a group of registers for accumulating pixel signals in a matrix area of M×N in order to perform computation using the pixel signals of the specified pixel and its surrounding pixels. Furthermore, these circuits 31, 32, 351 and 352 may share the registers.

After the pixel interpolation process is performed in the first and second interpolation circuits 351 and 352, each pixel becomes a signal having all the color components of RGB and is converted into a YCbCr signal by the first and second color space conversion circuits 361 and 362. Then, the pixel signal is stored into the memory 5.

<2. Representation of Pixels in Bayer Array>

Figure 2A:
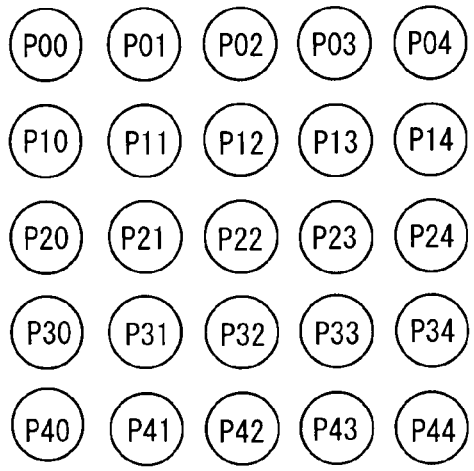
FIGS. 2A to 2E are views each showing an array pattern of pixels in a RGB Bayer array.

Next, discussion will be made on representation of pixels in Bayer array used in the following description and figures. The pixels in a matrix area of 5×5 are represented in FIG. 2A. In FIG. 2A, reference sign 'P' represents a pixel without consideration of color components of RGB. In contrast to this, in FIGS. 2B to 2E, pixels are represented with distinction of color components. Reference signs R, G and B represent a red pixel, a green pixel and a blue pixel, respectively. Further, in FIGS. 2 and 5 to 16, G pixels are represented by solid circles and R and B pixels are represented by broken-line circles.

Among two numbers following the reference signs P, R, G and B, the first number represents the row number of a pixel in the matrix area and the second number represents the column number of the pixel in the matrix area. FIGS. 2A to 2E each represent a pixel array of the matrix area consisting of 25 pixels, P00 to P44, including a specified pixel P22. The same representation is applied to other figures. Further, in description of the preferred embodiments and equations, the reference signs P, R, G and B sometimes represent pixel values. The reference sign P11, for example, represents a pixel at the first row and the first column and also represents the pixel value of the pixel at the first row and the first column.

Figure 2B:
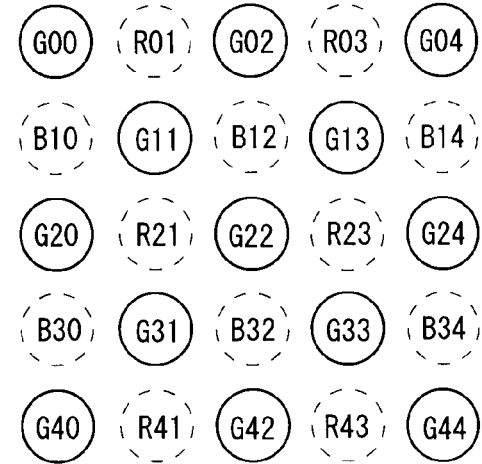
Figure 2C:
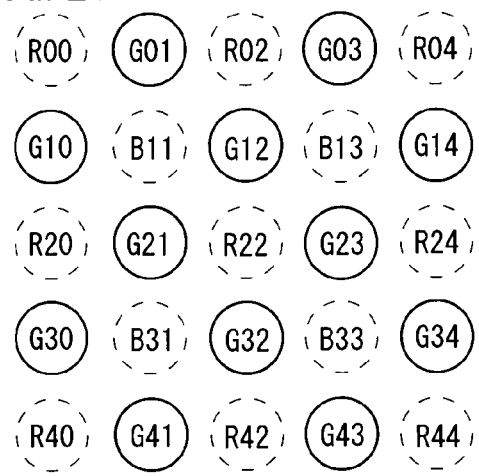
Figure 2D:
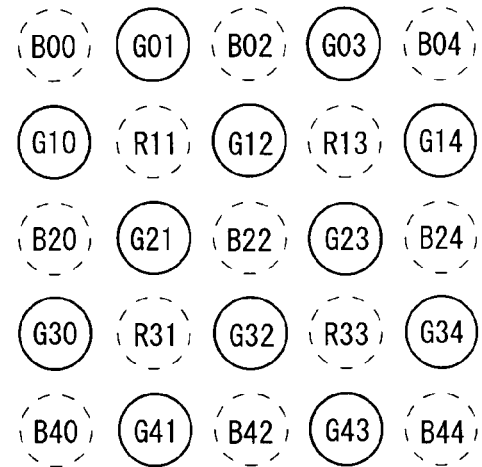
Figure 2E:
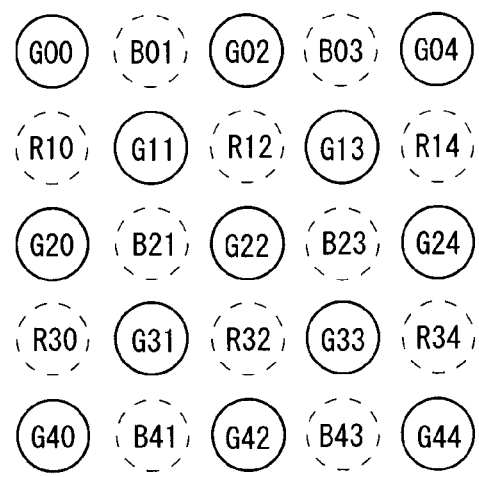

FIGS. 2B and 2E represent pixel arrays in a case where the specified pixel P22 is a G signal. FIG. 2C represents a pixel array in a case where the specified pixel P22 is an R signal. FIG. 2D represents a pixel array in a case where the specified pixel P22 is a B signal. As discussed above, in the chroma value calculation circuit 31, the correlation value calculation circuit 32 and the first and second interpolation circuits 351 and 352, the pixel signals in the matrix area are accumulated in the group of registers in order to perform computation using the pixel signals of the specified pixel and its surrounding pixels. In a case where pixels in a matrix area of 5×5 are to be processed, there are four patterns of pixel signals stored in the group of registers as shown in FIGS. 2B to 2E. Further, in a case where pixels in a matrix area of 3×3 are to be processed, nine pixels P11, P12, P13, P21, P22, P23, P31, P32 and P33, centering the specified pixel P22, are used and there are also four patterns of pixel signals as shown in FIGS. 2B to 2E.

<3. Chroma Value Calculation Process>

Next, detailed discussion will be made on a chroma value calculation process performed by the chroma value calculation circuit 31. The chroma value calculation circuit 31 analyzes a color difference component in a matrix area (consisting of a specified pixel and its surrounding pixels) including a specified pixel and calculates a chroma evaluation value of this area. This chroma evaluation value is used later in a selection step to judge whether an area to be processed is an image with high chroma (hereinafter, referred to as color image) or an image with low chroma (hereinafter, referred to as gray image).

The chroma evaluation value is calculated on the basis of a color difference component between the level of G pixel and the level of R pixel and a color difference component between the level of G pixel and the level of B pixel. In the first preferred embodiment, two color difference component evaluation values are calculated in order to determine the chroma evaluation value. In other words, the chroma value calculation circuit 31 calculates a "first color difference component evaluation value" and a "second color difference component evaluation value". The "first color difference component evaluation value" refers to an evaluation value obtained from a color difference component value on the basis of respective average pixel values for color components of the pixels existing in this area without consideration of the respective positions of the pixels in the matrix area. The "second color difference component evaluation value" refers to an evaluation value obtained by accumulating the color difference component values in a specific direction, in consideration of the respective positions of the pixels in the matrix area.

Thus, the reason why two kinds of color difference component evaluation values are calculated is as follows. In a gray image in which fine lines are present in a horizontal or vertical direction, such as retoma chart, if the above "first color difference component evaluation value" is adopted as the chroma value, there is a possibility that the gray image may be wrongly judged as a color image. The reason of this phenomenon is that even though there is a strong correlation in the horizontal or vertical direction, the color difference component is calculated by using the average pixel values in this area without consideration of this correlation. Then, in the first preferred embodiment, as discussed below, two kinds of color difference component evaluation values are calculated and the lower one in level of color difference component is adopted as the chroma value.

(3-1) The First Color Difference Component Evaluation Value

First, discussion will be made on a method of calculating the first color difference component evaluation value. The first color difference component evaluation value is suitable for evaluation of color difference components of flat parts (low-frequency areas) such as blue sky, wallpaper without any pattern, or the like. Herein, the flat part refers to an area having no strong correlation in a specific direction. In order to calculate the first color difference component evaluation value, first, respective average values $R_{ave}$, $G_{ave}$ and $B_{ave}$ of the pixel values for R, G and B included in a matrix area of 3×3 centering a specified pixel are calculated. The average values $R_{ave}$, $G_{ave}$ and $B_{ave}$ are generally expressed as Eq. 1. In Eq. 1, $N_R$, $N_G$ and $N_B$ represent the numbers of pixels of R, G and B, respectively, existing in this matrix area and the terms of $\Sigma$ represent respective cumulative pixel values for the three color components.

$$\begin{cases} R_{ave} = \dfrac{1}{N_R} \sum_i^{N_R} R_i \\ G_{ave} = \dfrac{1}{N_G} \sum_i^{N_G} G_i \\ B_{ave} = \dfrac{1}{N_B} \sum_i^{N_B} B_i \end{cases} \quad (\text{Eq. 1})$$

As shown in FIGS. 2B to 2E, however, since there are four patterns of pixel arrays, the method of calculating the average value is different from pattern to pattern. First, in a case where the center pixel is a G pixel and the pattern corresponds to the pixel array of FIG. 2B, the average values $R_{ave}$, $G_{ave}$ and $B_{ave}$ are calculated from Eq. 2.

$$G_{ave} = \frac{G11 + G13 + G22 + G31 + G33}{5} \quad (\text{Eq. 2})$$

$$R_{ave} = \frac{R21 + R23}{2}$$

$$B_{ave} = \frac{B12 + B32}{2}$$

In a case where the center pixel is an R pixel and the pattern corresponds to the pixel array of FIG. 2C, the average values $R_{ave}$, $G_{ave}$ and $B_{ave}$ are calculated from Eq. 3.

$$G_{ave} = \frac{G12 + G21 + G23 + G32}{4} \quad (\text{Eq. 3})$$

$$R_{ave} = R22$$

$$B_{ave} = \frac{B11 + B13 + B31 + B33}{4}$$

In a case where the center pixel is a B pixel and the pattern corresponds to the pixel array of FIG. 2D, the average values $R_{ave}$, $G_{ave}$ and $B_{ave}$ are calculated from Eq. 4.

$$G_{ave} = \frac{G12 + G21 + G23 + G32}{4} \quad (\text{Eq. 4})$$

$$R_{ave} = \frac{R11 + R13 + R31 + R33}{4}$$

$$B_{ave} = B22$$

In a case where the center pixel is a G pixel and the pattern corresponds to the pixel array of FIG. 2E, the average values $R_{ave}$, $G_{ave}$ and $B_{ave}$ are calculated from Eq. 5.

$$G_{ave} = \frac{G11 + G13 + G22 + G31 + G33}{5} \quad \text{(Eq. 5)}$$

$$R_{ave} = \frac{R12 + R32}{2}$$

$$B_{ave} = \frac{B21 + B23}{2}$$

The chroma value calculation circuit 31 performs computation in accordance with any one of Eqs. 2 to 5 depending on which one of the patterns shown in FIGS. 2B to 2E the pixel array of the matrix area is, to calculate the average values $R_{ave}$, $G_{ave}$ and $B_{ave}$. The chroma value calculation circuit 31 further performs computation expressed by Eq. 6 by using the calculated average values $R_{ave}$, $G_{ave}$ and $B_{ave}$, to calculate the first color difference component evaluation value $L_{global}$. In other words, the color difference component evaluation value $L_{global}$ is an evaluation value of color difference component, which is calculated by using the color difference component value on the basis of the respective average pixel values for the color components existing in the matrix area.

$$L_{global} = \frac{|G_{ave} - R_{ave}| + |G_{ave} - B_{ave}|}{2} \quad \text{(Eq. 6)}$$

(3-2) The Second Color Difference Component Evaluation Value

Next, discussion will be made on a method of calculating the second color difference component evaluation value. The second color difference component evaluation value is suitable for evaluation of color difference components in an area where there is a strong correlation in a matrix area and the chroma value may largely vary depending on the method of calculating the color difference component value. As discussed above, for example, if the first color difference component evaluation value obtained in (3-1) is adopted as the chroma evaluation value in a gray image including a high-frequency component, such as a retoma chart or the like, there is a possibility that the gray image may be wrongly judged as a color image. Then, in order to appropriately obtain the color difference component evaluation value for such an image having a strong correlation in a specific direction, the following operation is performed.

The chroma value calculation circuit 31 performs computation expressed by Eqs. 7 and 8 by using pixel signals in a matrix area of 3×3. Specifically, in Eq. 7, the color difference component values are accumulated in the vertical direction, to calculate the color difference component evaluation value $L_{vertical}$ in the vertical direction. Further, in Eq. 8, the color difference component values are accumulated in the horizontal direction, to calculate the color difference component evaluation value $L_{horizontal}$ in the horizontal direction. In other words, in the computations of Eqs. 7 and 8, the color difference component values of the G pixels and the R pixels and the color difference component values of the G pixels and the B pixels are accumulated in the vertical direction and the horizontal direction, respectively. Both the color difference component evaluation values $L_{vertical}$ and $L_{horizontal}$ are the above-discussed second color difference component evaluation values.

$$L_{vertical} = \frac{|P11 - P21| + |P21 - P31| + 2|P12 - P22| + 2|P22 - P32| + |P13 - P23| + |P23 - P33|}{8} \quad \text{(Eq. 7)}$$

$$L_{horizontal} = \frac{|P11 - P12| + |P12 - P13| + 2|P21 - P22| + 2|P22 - P23| + |P31 - P32| + |P32 - P33|}{8} \quad \text{(Eq. 8)}$$

Further, in Eqs. 7 and 8, there are terms multiplied by a coefficient of "2". This is for coincidence between the color difference component cumulative number of the G and R pixels and that of the G and B pixels. Though the coefficient of "2" is used as a multiplier for coincidence between the cumulative numbers of different color difference components in the first preferred embodiment, however, the value of this coefficient may be set as appropriate.

Further, though the color difference component evaluation values in the horizontal and vertical directions are calculated in the first preferred embodiment, color difference component evaluation values in diagonal directions may be additionally calculated as objects of evaluation. For example, a color difference component evaluation value $Ld_A$ of a diagonal A direction which has the inclination of 45 degrees clockwisely from the horizontal direction with respect to the specified pixel P22 and a color difference component evaluation value $Ld_B$ of a diagonal B direction orthogonal to the diagonal A direction can be obtained from Eqs. 9 and 10. Eq. 9 is an equation, however, which is used in the case where the specified pixel P22 is a G pixel and Eq. 10 is an equation which is used in the case where the specified pixel P22 is an R pixel or a B pixel.

$$Ld_A = \left( \left| \frac{P13 + P22}{2} - P12 \right| + \left| \frac{P13 + P22}{2} - P23 \right| + \left| \frac{P31 + P22}{2} - P21 \right| + \left| \frac{P31 + P22}{2} - P32 \right| \right) \times \frac{1}{4} \quad \text{(Eq. 9)}$$

$$Ld_B = \left( \left| \frac{P11 + P22}{2} - P12 \right| + \left| \frac{P11 + P22}{2} - P21 \right| + \left| \frac{P33 + P22}{2} - P23 \right| + \left| \frac{P33 + P22}{2} - P32 \right| \right) \times \frac{1}{4}$$

$$Ld_A = \left( \left| \frac{P12 + P21}{2} - P11 \right| + \left| \frac{P12 + P21}{2} - P22 \right| + \left| \frac{P23 + P32}{2} - P21 \right| + \left| \frac{P23 + P32}{2} - P33 \right| \right) \times \frac{1}{4} \quad \text{(Eq. 10)}$$

$$Ld_B = \left( \left| \frac{P12 + P23}{2} - P13 \right| + \left| \frac{P12 + P23}{2} - P22 \right| + \left| \frac{P21 + P32}{2} - P22 \right| + \left| \frac{P21 + P32}{2} - P31 \right| \right) \times \frac{1}{4}$$

(3-3) Calculation of Chroma Factor

After calculating the three color difference component evaluation values $L_{global}$, $L_{vertical}$ and $L_{horizontal}$ by using the calculation methods as shown above in (3-1) and (3-2), the chroma value calculation circuit 31 further performs computation expressed by Eq. 11, to calculate a minimum value of the color difference component evaluation values $L_{global}$, $L_{vertical}$ and $L_{horizontal}$ (in other words, the smallest one in level of the color difference component). This minimum value is adopted as a chroma evaluation value L of the matrix area to be processed. In other words, the chroma evaluation value L is a chroma value determined in accordance with the specified pixel. In Eq. 11, min (x, y, z) represents the minimum value of x, y and z. Further, as discussed above, the color difference component evaluation values in the diagonal directions may be calculated as the second color difference component evaluation values as well as $L_{vertical}$ and $L_{horizontal}$, and in such a case, the minimum value has to be selected among the evaluation values including the color difference component evaluation values in the diagonal directions.

$$L = \min(L_{global}, L_{horizontal}, L_{vertical}) \quad \text{(Eq. 11)}$$

Figure 3:
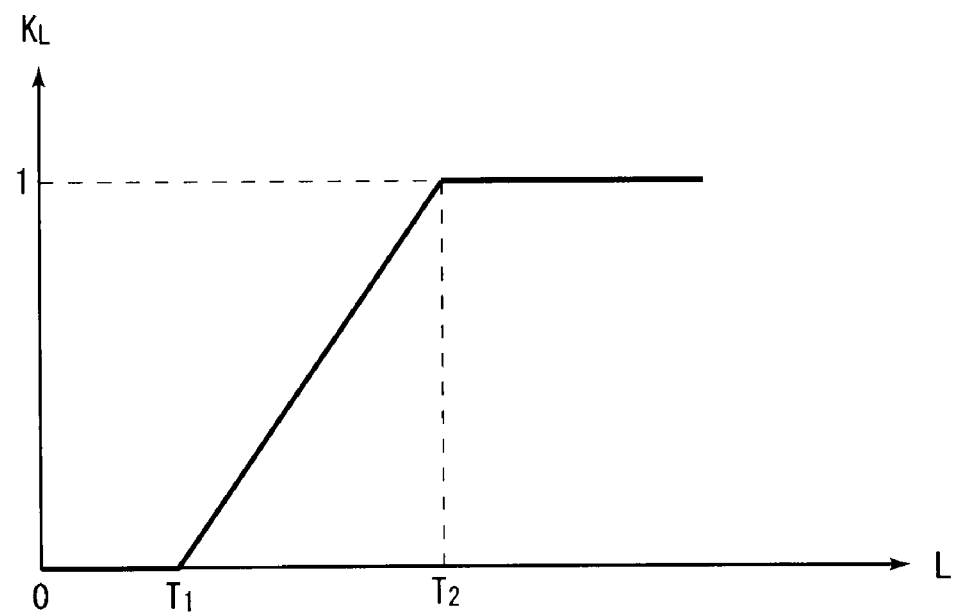
FIG. 3 is a graph showing a relation between a chroma value and a chroma factor.

After performing the above computations to obtain the chroma evaluation value L with respect to the specified pixel, the chroma value calculation circuit 31 next normalizes the chroma evaluation value L to calculate a chroma factor $K_L$. Specifically, the chroma value calculation circuit 31 uses two threshold values $T_1$ and $T_2$ to perform normalization as expressed by Eq. 12. FIG. 3 is a graph showing a relation between the chroma evaluation value L and the chroma factor $K_L$. As shown in FIG. 3, the chroma factor $K_L$ for judgment on whether a gray image or a color image gently changes between the threshold values $T_1$ and $T_2$ which are set near the area where there is a change from a gray image to a color image, to ease a sharp change of image judgment.

$$\text{When } L \leq T_1 \quad K_L = 0 \quad \text{(Eq. 12)}$$
$$\text{When } T_1 < L < T_2 \quad K_L = \frac{L - T_1}{T_2 - T_1}$$
$$\text{When } T_2 \leq L \quad K_L = 1$$

Further, since the two threshold values $T_1$ and $T_2$ are set near the boundary between the gray image and the color image, these values have only to be determined appropriately on the basis of experimental results or experience but preferably should be variable parameters depending on characteristics of an input image. The characteristics of an input image are determined on the basis of photographing conditions such as the exposure time, the aperture and the like. Further, besides the characteristics of an input image, the characteristics of a CCD, optical characteristics of a lens and the like may be taken into account. The chroma factor $K_L$ which is calculated thus is used later in the selection step.

<4. Correlation Value Calculation Process>

Figure 4:
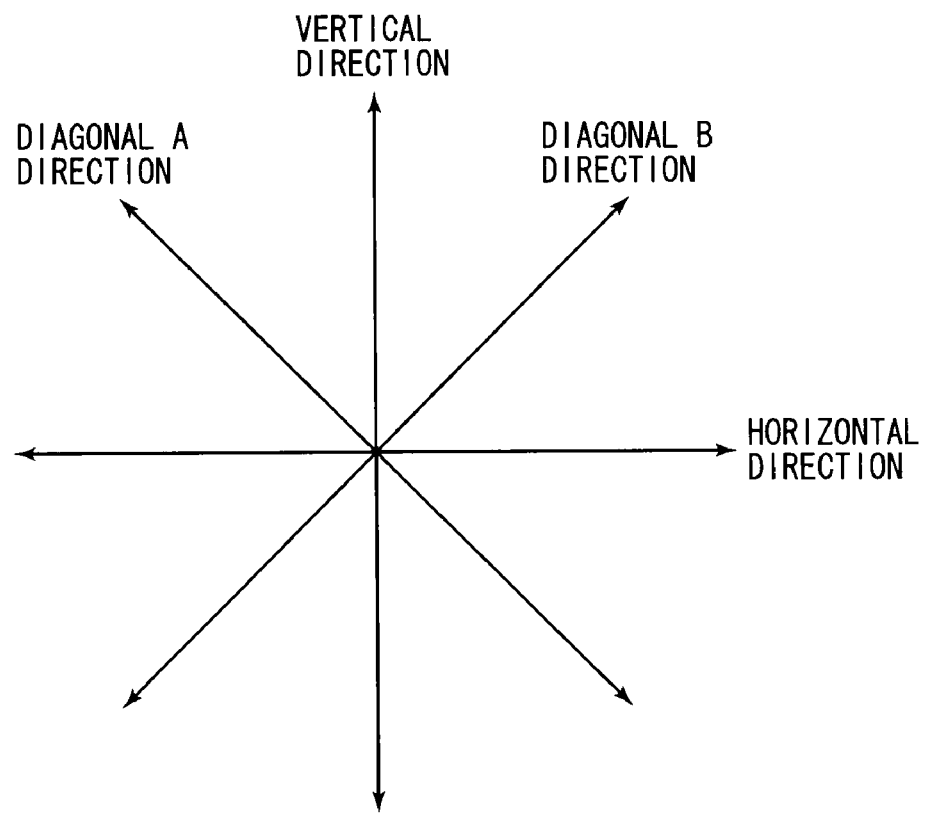
FIG. 4 is a view showing four correlation directions.

The correlation value calculation circuit 32 uses the pixel signals of the specified pixel and its surrounding pixels to calculate correlation values in four directions in the matrix area. Herein, as shown in FIG. 4, the correlation values are calculated in the horizontal direction, the vertical direction, the diagonal A direction having the inclination of 45 degrees clockwisely with respect to the horizontal direction and the diagonal B direction orthogonal to the diagonal A direction. Specifically, a pixel differential value which is a difference between the values of the pixels existing in each of these four directions is calculated and the pixel differential values in each direction are accumulated, to obtain the correlation value.

Further, in the first preferred embodiment, the correlation value calculation circuit 32 calculates both a correlation value for color image having high chroma and a correlation value for gray image having low chroma. Then, finally in the selection process of the later step, either one of the correlation values for color image and gray image is selected and a correlation direction is determined. Alternatively, a correlation value selected by overall judgment on both the correlation values for color image and the gray image is used to determine the correlation direction.

Figure 5A:
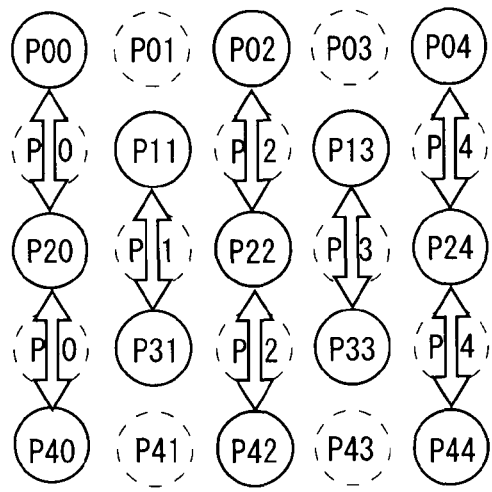
FIGS. 5A and 5B are views each showing a correlation value calculation method in a vertical direction in a color area where a specified pixel is a G pixel.
Figure 5B:
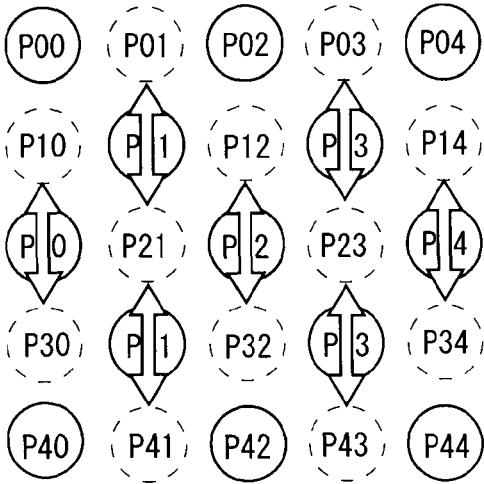

(4-1) Correlation Value for Color Image Having High Chroma (4-1-1) Case where Center Pixel is G First, discussion will be made on a correlation value calculation method for color image in a case where the specified pixel is a G pixel. In other words, this is a correlation value calculation method in a case where the matrix area has such a pixel array as shown in FIG. 2B or 2E. A correlation value in the vertical direction is calculated from Eq. 13. FIGS. 5A and 5B are views each showing a correlation value calculation method in the vertical direction, and FIG. 5A shows a correlation value calculation method on G pixels and FIG. 5B shows a correlation value calculation method on R pixels and B pixels. Thus, the correlation value for color image takes pixel differential values of all the color components into account. In FIGS. 5 to 16, two pixels connected with an arrow are objects for calculation of the pixel differential value.

$$Cv\_c = \quad \text{(Eq. 13)}$$
$$(|P02 - P22| + |P22 - P42| + |P11 - P31| + |P13 - P33| +$$
$$|P00 - P20| + |P20 - P40| + |P04 - P24| + |P24 - P44| +$$
$$|P12 - P32| + |P10 - P30| + |P14 - P34| + |P01 - P21| +$$
$$|P21 - P41| + |P03 - P23| + |P23 - P43|) \times \frac{1}{15}$$

Figure 6A:
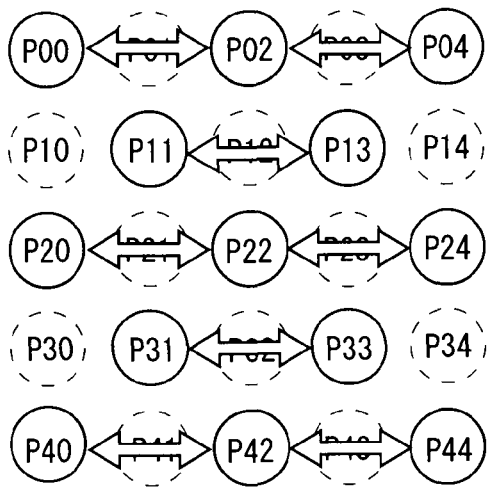
FIGS. 6A and 6B are views each showing a correlation value calculation method in a horizontal direction in the color area where the specified pixel is a G pixel.
Figure 6B:
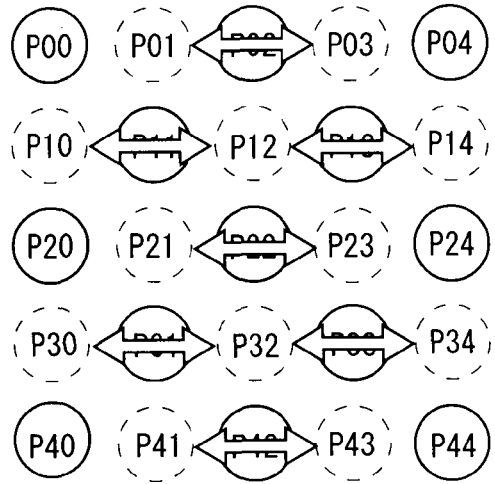

A correlation value in the horizontal direction is calculated from Eq. 14. FIGS. 6A and 6B are views each showing a correlation value calculation method in the horizontal direction, and FIG. 6A shows a correlation value calculation method on G pixels and FIG. 6B shows a correlation value calculation method on R pixels and B pixels.

$$Ch\_c = \quad \text{(Eq. 14)}$$
$$(|P20 - P22| + |P22 - P24| + |P11 - P13| + |P31 - P33| +$$
$$|P00 - P02| + |P02 - P04| + |P40 - P42| + |P42 - P44| +$$
$$|P21 - P23| + |P01 - P03| + |P41 - P43| + |P10 - P12| +$$
$$|P12 - P14| + |P30 - P32| + |P32 - P34|) \times \frac{1}{15}$$

Figure 7A:
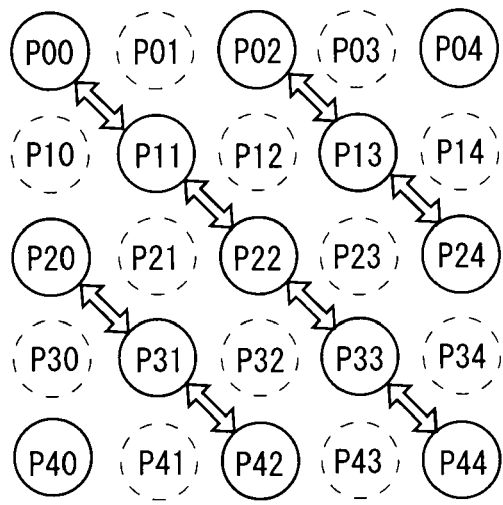
FIGS. 7A to 7C are views each showing a correlation value calculation method in a diagonal A direction in the color area where the specified pixel is a G pixel.
Figure 7B:
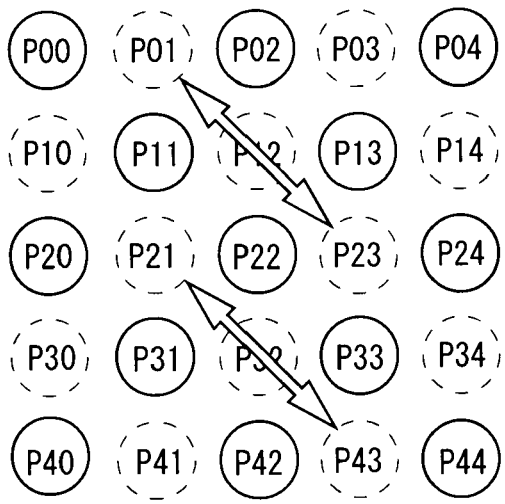
Figure 7C:
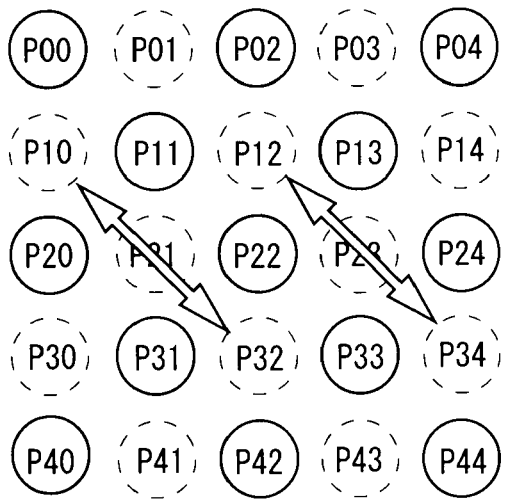

A correlation value in the diagonal A direction is calculated from Eq. 15. FIGS. 7A to 7C are views each showing a correlation value calculation method in the diagonal A direction, and FIG. 7A shows a correlation value calculation method on G pixels and FIGS. 7B and 7C show correlation value calculation methods on R pixels and B pixels, respectively.

$$Cd_{A\_c} = (|P11 - P22| \times 2 + |P22 - P33| \times 2 + |P02 - P13| \times 2 + \quad \text{(Eq. 15)}$$
$$|P13 - P24| \times 2 + |P20 - P31| \times 2 + |P31 - P42| \times 2 +$$
$$|P00 - P11| \times 2 + |P33 - P44| \times 2 + |P01 - P23| +$$
$$|P21 - P43| + |P12 - P34| + |P10 - P32|) \times \frac{1}{12}$$

As shown in FIGS. 7A to 7C, between the case of calculation on G pixels and the case of calculation on R pixels or B pixels, there is a difference in the distance between pixels on which the differential value is calculated. Then, in Eq. 15, the differential value on two G pixels with short distance is multiplied by 2. The reason is that the distance between two G pixels which are objects for calculation is half the distance between two R pixels or two B pixels which are objects for calculation and the pixel differential value responds to the amount of variation on G pixels that is twice as large as that on R pixels or B pixels. The multiplier of 2, however, is an example and may be selected as appropriate.

Figure 8A:
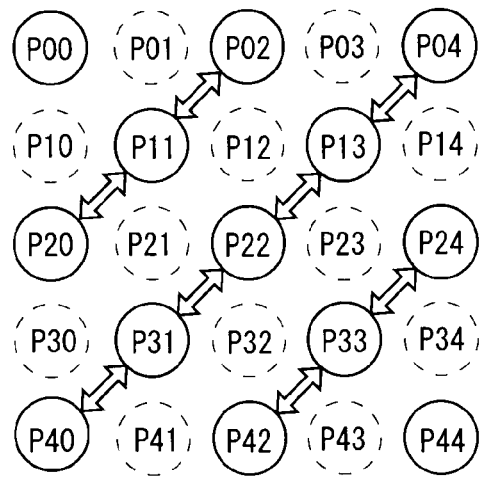
FIGS. 8A to 8C are views each showing a correlation value calculation method in a diagonal B direction in the color area where the specified pixel is a G pixel.
Figure 8B:
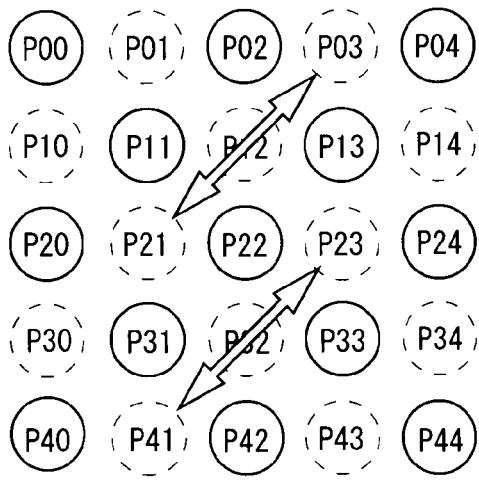
Figure 8C:
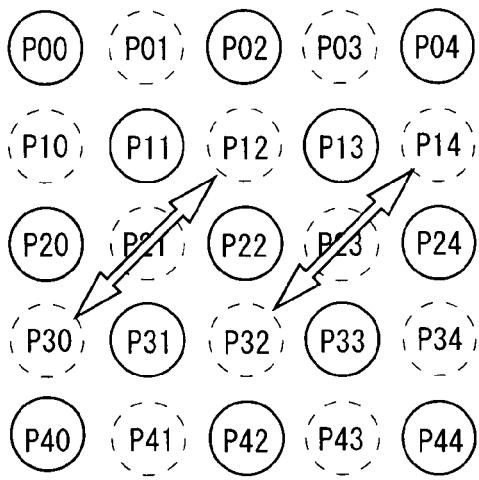

A correlation value in the diagonal B direction is calculated from Eq. 16. FIGS. 8A to 8C are views each showing a correlation value calculation method in the diagonal B direction, and FIG. 8A shows a correlation value calculation method on G pixels and FIGS. 8B and 8C show correlation value calculation methods on R pixels and B pixels, respectively.

$$Cd_{B\_c} = (|P13 - P22| \times 2 + |P22 - P31| \times 2 + |P02 - P11| \times 2 + \quad \text{(Eq. 16)}$$
$$|P11 - P20| \times 2 + |P24 - P33| \times 2 + |P33 - P42| \times 2 +$$
$$|P04 - P13| \times 2 + |P31 - P40| \times 2 + |P03 - P21| +$$
$$|P23 - P41| + |P12 - P30| + |P14 - P32|) \times \frac{1}{12}$$

Also in Eq. 16, like in Eq. 15, the differential value on two G pixels is multiplied by 2. Further, though the distance between pixels in FIGS. 7B, 7C, 8B and 8C is different from that in FIGS. 5A, 5B, 6A and 6B, herein the distance is regarded as equal, as the distance between two pixels with one pixel inserted therebetween. The differential value may be multiplied by a coefficient, however, taking the distance between the pixels into account.

(4-1-2) Case where Center Pixel is B or R

Figure 9A:
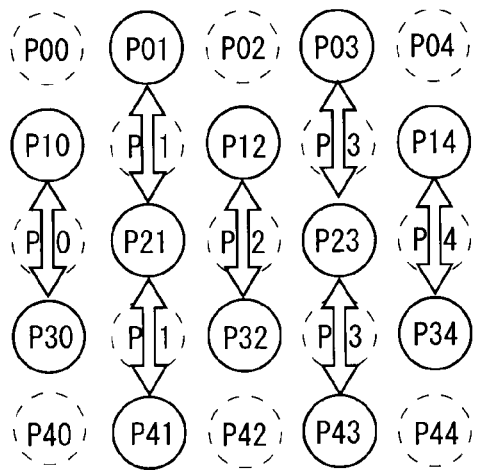
FIGS. 9A and 9B are views each showing a correlation value calculation method in the vertical direction in a color area where the specified pixel is an R pixel or a B pixel.
Figure 9B:
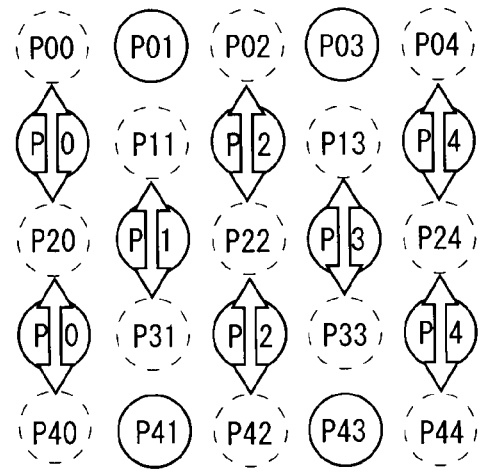

Next, discussion will be made on a correlation value calculation method for color image in a case where the specified pixel is a B or R pixel. In other words, this is a correlation value calculation method in a case where the matrix area has such a pixel array as shown in FIG. 2C or 2D. A correlation value in the vertical direction is calculated from Eq. 17. FIGS. 9A and 9B are views each showing a correlation value calculation method in the vertical direction, and FIG. 9A shows a correlation value calculation method on G pixels and FIG. 9B shows a correlation value calculation method on R pixels and B pixels.

$$Cv\_c = \quad \text{(Eq. 17)}$$
$$(|P12 - P32| + |P01 - P21| + |P21 - P41| + |P03 - P23| +$$
$$|P23 - P43| + |P10 - P30| + |P14 - P34| + |P11 - P31| +$$
$$|P13 - P33| + |P02 - P22| + |P22 - P42| + |P00 - P20| +$$
$$|P20 - P40| + |P04 - P24| + |P24 - P44|) \times \frac{1}{15}$$

Figure 10A:
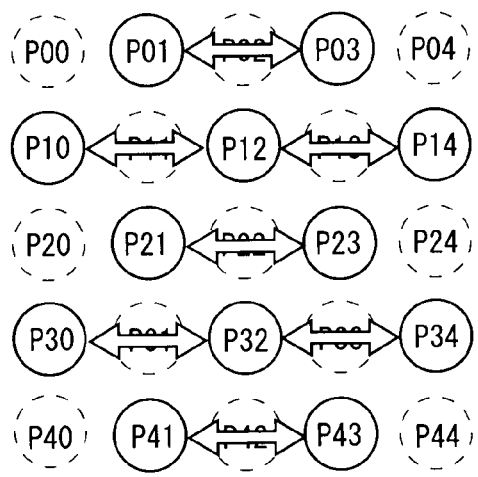
FIGS. 10A and 10B are views each showing a correlation value calculation method in the horizontal direction in the color area where the specified pixel is an R pixel or a B pixel.
Figure 10B:
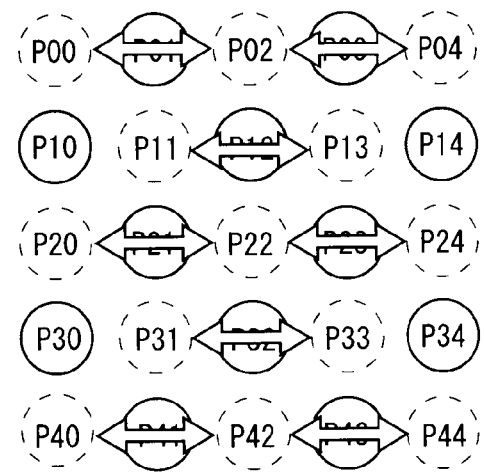

A correlation value in the horizontal direction is calculated from Eq. 18. FIGS. 10A and 10B are views each showing a correlation value calculation method in the horizontal direction, and FIG. 10A shows a correlation value calculation method on G pixels and FIG. 10B shows a correlation value calculation method on R pixels and B pixels.

$$Ch\_c = \quad \text{(Eq. 18)}$$
$$(|P21 - P23| + |P10 - P12| + |P12 - P14| + |P30 - P32| +$$
$$|P32 - P34| + |P01 - P03| + |P41 - P43| + |P11 - P13| +$$
$$|P31 - P33| + |P20 - P22| + |P22 - P24| + |P00 - P02| +$$
$$|P02 - P04| + |P40 - P42| + |P42 - P44|) \times \frac{1}{15}$$

Figure 11A:
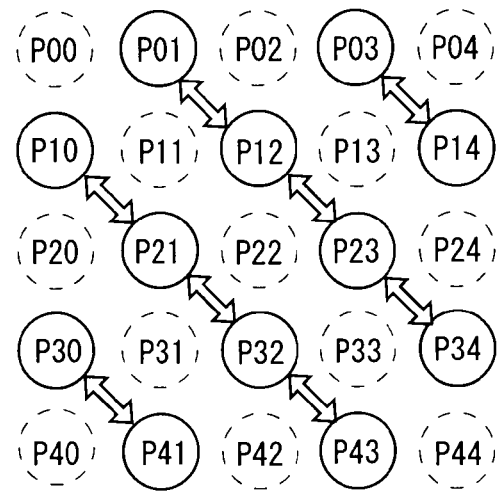
FIGS. 11A to 11C are views each showing a correlation value calculation method in the diagonal A direction in the color area where the specified pixel is an R pixel or a B pixel.
Figure 11B:
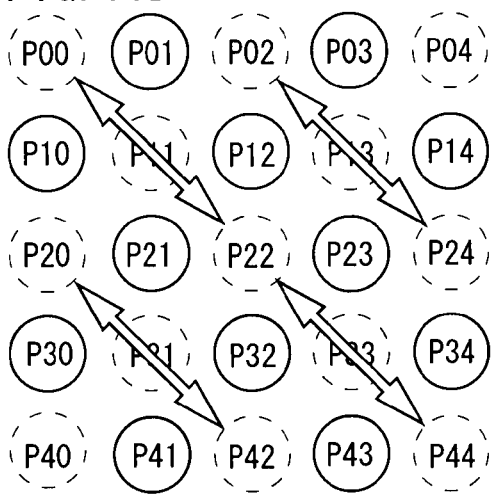
Figure 11C:
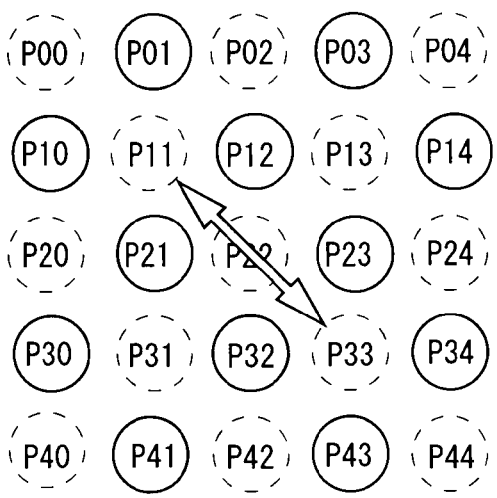

A correlation value in the diagonal A direction is calculated from Eq. 19. FIGS. 11A to 11C are views each showing a correlation value calculation method in the diagonal A direction, and FIG. 11A shows a correlation value calculation method on G pixels and FIGS. 11B and 11C show correlation value calculation methods on R pixels and B pixels, respectively.

$$Cd_{A\_c} = (|P12 - P23| \times 2 + |P21 - P32| \times 2 + \quad \text{(Eq. 19)}$$
$$|P01 - P12| \times 2 + |P23 - P34| \times 2 +$$
$$|P10 - P21| \times 2 + |P32 - P43| \times 2 + |P03 - P14| \times 2 +$$
$$|P30 - P41| \times 2 + |P11 - P33| + |P00 - P22| +$$
$$|P22 - P44| + |P02 - P24| + |P20 - P42|) \times \frac{1}{13}$$

Figure 12A:
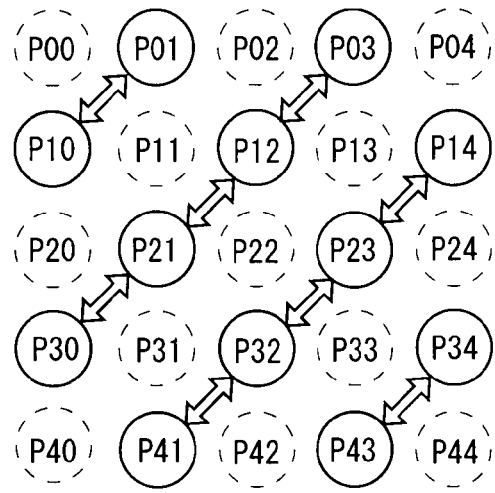
FIGS. 12A to 12C are views each showing a correlation value calculation method in the diagonal B direction in the color area where the specified pixel is an R pixel or a B pixel.
Figure 12B:
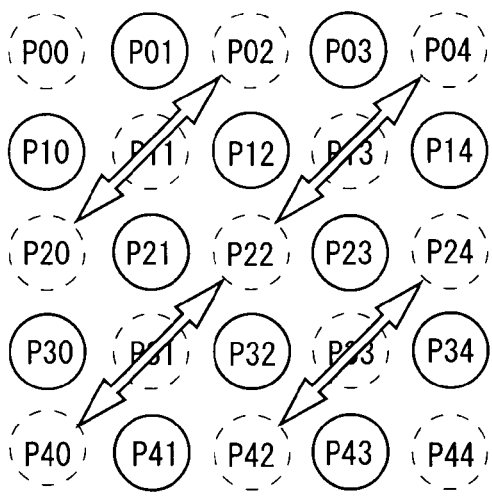
Figure 12C:
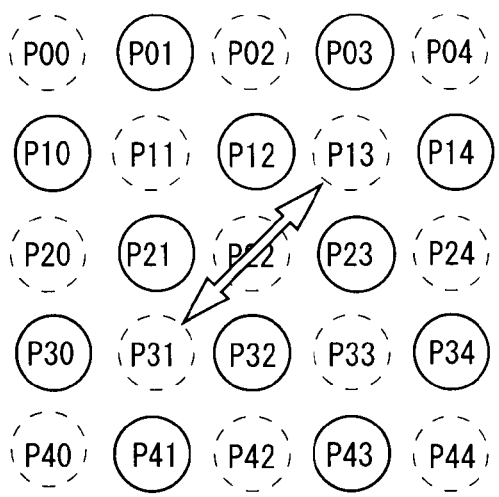

A correlation value in the diagonal B direction is calculated from Eq. 20. FIGS. 12A to 12C are views each showing a correlation value calculation method in the diagonal B direction, and FIG. 12A shows a correlation value calculation method on G pixels and FIGS. 12B and 12C show correlation value calculation methods on R pixels and B pixels, respectively.

$$Cd_{B\_c} = (|P12 - P21| \times 2 + |P23 - P32| \times 2 + \quad \text{(Eq. 20)}$$
$$|P03 - P12| \times 2 + |P21 - P30| \times 2 +$$
$$|P14 - P23| \times 2 + |P32 - P41| \times 2 + |P01 - P10| \times 2 +$$
$$|P34 - P43| \times 2 + |P13 - P31| + |P04 - P22| +$$
$$|P22 - P40| + |P02 - P20| + |P24 - P42|) \times \frac{1}{13}$$

Also in Eqs. 19 and 20, as discussed in Eq. 15, the differential value on two G pixels is multiplied by 2. Further, though the distance between pixels in FIGS. 11B, 11C, 12B and 12C is different from that in FIGS. 9B and 10B, herein the distance is regarded as equal, as the distance between two pixels with one pixel inserted therebetween. The differential value may be multiplied by a coefficient, however, taking the distance between the pixels into account.

(4-2) Correlation Value for Gray Image Having Low Chroma

Figure 13:
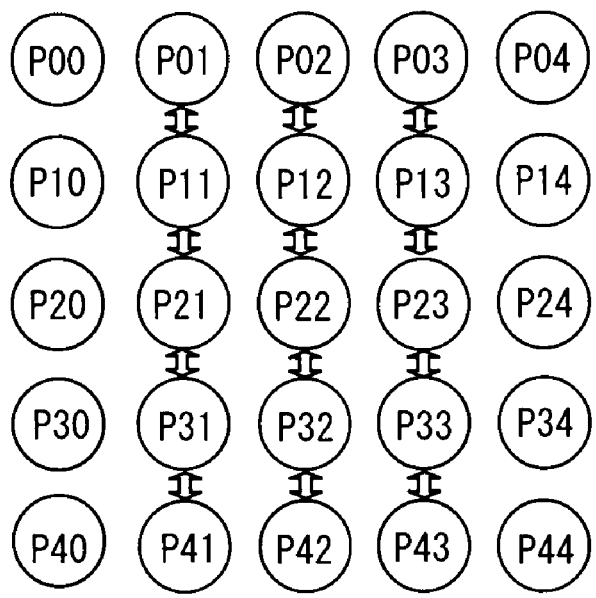
FIG. 13 is a view showing a correlation value calculation method in the vertical direction in a gray area.

For gray image having low chroma, correlation values are calculated without distinction of the type of the specified pixel, i.e., R, G or B. In other words, the correlation values are calculated by the following common computation, regardless of whatever the pixel array of the matrix area is among these shown in FIGS. 2B to 2E. A correlation value in the vertical direction is calculated from Eq. 21. FIG. 13 is a view showing a correlation value calculation method in the vertical direction.

$$Cv\_m = \quad \text{(Eq. 21)}$$
$$(|P02 - P12| + |P12 - P22| + |P22 - P32| + |P32 - P42| +$$
$$|P01 - P11| + |P11 - P21| + |P21 - P31| +$$

$$|P31 - P41| + |P03 - P13| + |P13 - P23| +$$
$$|P23 - P33| + |P33 - P43|) \times \frac{1}{16}$$

Figure 14:
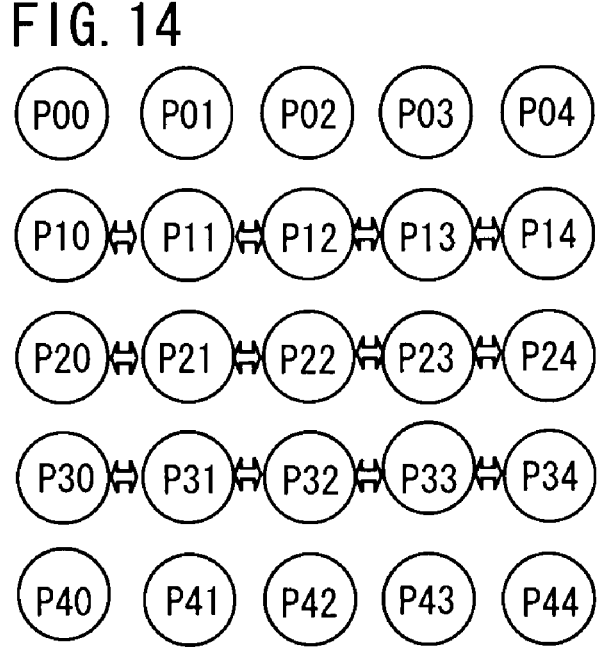
FIG. 14 is a view showing a correlation value calculation method in the horizontal direction in the gray area.

A correlation value in the horizontal direction is calculated from Eq. 22. FIG. 14 is a view showing a correlation value calculation method in the horizontal direction.

$$Ch\_m = \quad \text{(Eq. 22)}$$
$$(|P20 - P21| + |P21 - P22| + |P22 - P23| + |P23 - P24| +$$
$$|P10 - P11| + |P11 - P12| + |P12 - P13| +$$
$$|P13 - P14| + |P30 - P31| + |P31 - P32| +$$
$$|P32 - P33| + |P33 - P34|) \times \frac{1}{6}$$

Figure 15:
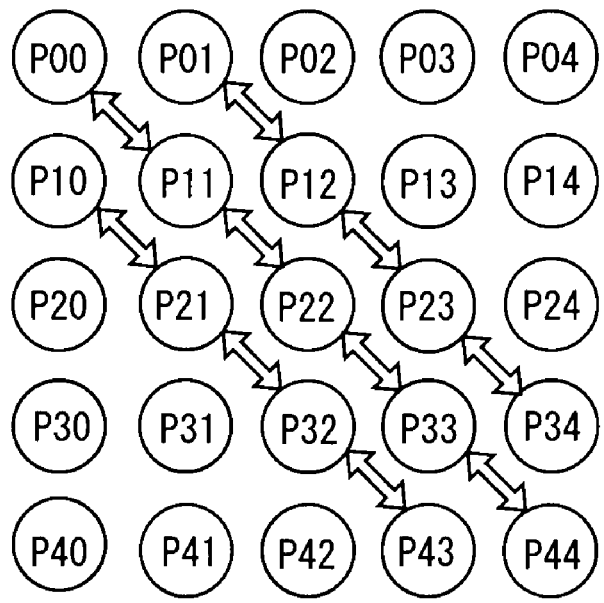
FIG. 15 is a view showing a correlation value calculation method in the diagonal A direction in the gray area.

A correlation value in the diagonal A direction is calculated from Eq. 23. FIG. 15 is a view showing a correlation value calculation method in the diagonal A direction.

$$Cd_A\_m = \quad \text{(Eq. 23)}$$
$$(|P00 - P11| + |P11 - P22| + |P22 - P33| + |P33 - P44| +$$
$$|P10 - P21| + |P21 - P32| + |P32 - P43| +$$
$$|P01 - P12| + |P12 - P23| + |P23 - P34|) \times \frac{1}{5}$$

Figure 16:
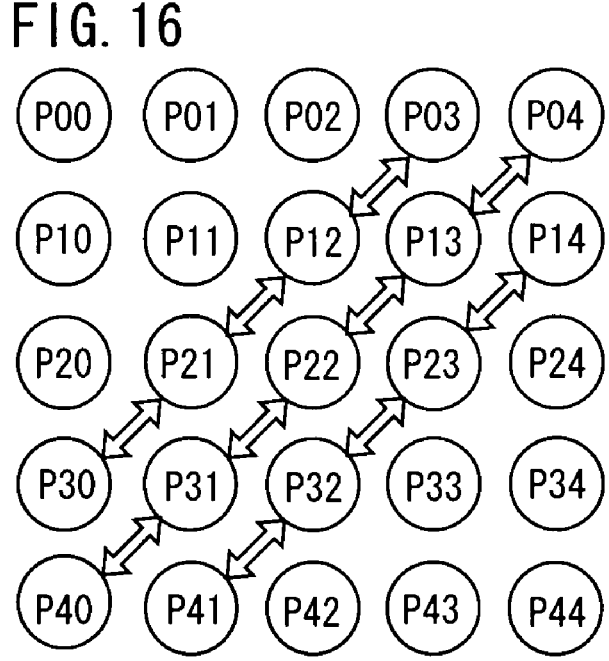
FIG. 16 is a view showing a correlation value calculation method in the diagonal B direction in the gray area.

A correlation value in the diagonal B direction is calculated from Eq. 24. FIG. 16 is a view showing a correlation value calculation method in the diagonal B direction.

$$Cd_B\_m = \quad \text{(Eq. 24)}$$
$$(|P04 - P13| + |P13 - P22| + |P22 - P31| + |P31 - P40| +$$
$$|P03 - P12| + |P12 - P21| + |P21 - P30| +$$
$$|P14 - P23| + |P23 - P32| + |P32 - P41|) \times \frac{1}{5}$$

Further, the distance between pixels used for calculation of the differential value in FIGS. 13 and 14 is different from that in FIGS. 15 and 16. But, herein, the differential value is not multiplied by a coefficient taking the distance between pixels into account as discussed in Eq. 15. The reason is that the difference in the distance between pixels is not much large, but the pixel differential value in Eqs. 21 and 22, for example, may be multiplied by the square root of 2.

Further, in Eqs. 21 to 24, for easier comparison with the above-discussed correlation value for color image, the scale is matched. Specifically, the distance between pixels used for calculation shown in FIGS. 13 to 16 is a distance between two adjacent pixels. Therefore, in Eqs. 21 to 24, as the result that each pixel differential value is multiplied by 2 to match the scale, the final multiplier ($\frac{1}{6}$ and $\frac{1}{5}$) is twice the reciprocal of the cumulative number in each equation. Since the correlation direction in a gray image, however, is judged by using only the correlation value for gray image, it is not always necessary to match the scale.

<5. Selection of Correlation Judgment Method and Pixel Interpolation Method>

The selection circuit 33 selects a correlation judgment method and a pixel interpolation method on the basis of the relation among the chroma factor $K_L$ calculated by the chroma value calculation circuit 31 and threshold values TH1 and TH2 (TH1≧TH2). Specifically, selection of the correlation judgment method is to select among methods of judging the correlation direction, by adopting the correlation value for gray image, by adopting the correlation value for color image or by performing an overall judgment on the correlation values for gray image and color image to select one and using the selected correlation value. Selection of the pixel interpolation method is to select whether the pixel interpolation method for gray image or the method for color image is adopted.

FIG. 17 is a view showing the types of correlation judgment method and pixel interpolation method to be selected on the basis of the relation among the chroma factor $K_L$ and the threshold values TH1 and TH2. Specifically, selections are classified into the following patterns (a) to (c) of combinations of the methods.

(a) $K_L$>TH1 correlation judgment method: the correlation direction is judged by using the correlation value for color image.

pixel interpolation method: the pixel interpolation method for color image is used.

(b) TH1≧$K_L$>TH2 correlation judgment method: the correlation direction is judged by using the correlation value selected by overall judgment on the correlation values for color image and gray image.

pixel interpolation method: the pixel interpolation method for color image is used.

(c) TH2≧$K_L$ correlation judgment method: the correlation direction is judged by using the correlation value for gray image.

pixel interpolation method: the pixel interpolation method for gray image is used.

By using Eqs. 13 to 20, the correlation values Cv_c, Ch_c, $Cd_A$_c and $Cd_B$_c for color image in the four directions are calculated. Further, by using Eqs. 21 to 24, the correlation values Cv_m, Ch_m, $Cd_A$_m and $Cd_B$_m for gray image in the four directions are calculated. The selection circuit 33 selects judgment correlation values Cv, Ch, $Cd_A$ and $Cd_B$ which are to be used actually for judgment on the correlation direction, out of the calculated correlation values for gray image and color image as discussed below.

(5-1) (a) Judgment Correlation Value when $K_L$>TH1

As shown in Eq. 25, the correlation values for color image are used as the judgment correlation values Cv, Ch, $Cd_A$ and $Cd_B$.

$$Cv = Cv\_c$$
$$Ch = Ch\_c$$
$$Cd_A = Cd_A\_c$$
$$Cd_B = Cd_B\_c \quad \text{(Eq. 25)}$$

(5-2) (c) Judgment Correlation Value when TH2≧$K_L$

As shown in Eq. 26, the correlation values for gray image are used as the judgment correlation values Cv, Ch, $Cd_A$ and $Cd_B$.

$$Cv = Cv\_m$$
$$Ch = Ch\_m$$
$$Cd_A = Cd_A\_m$$
$$Cd_B = Cd_B\_m \quad \text{(Eq. 26)}$$

(5-3) (b) Judgment Correlation Value when $TH1 \geq K_L > TH2$

By overall judgment on the correlation values for gray image and color image, the judgment correlation values Cv, Ch, $Cd_A$ and $Cd_B$ are determined. Detailed discussion will be made below on this judgment method.

First, as shown in Eq. 27, a differential absolute value d_Cv_c between the correlation values Cv_c and Ch_c for color image is obtained.

$$d\_Cv\_c = \text{abs}(Cv\_c - Ch\_c) \quad \text{(Eq. 27)}$$

As shown in Eq. 28, a differential absolute value d_Cv_m between the correlation values Cv_m and Ch_m for gray image is obtained.

$$d\_Cv\_m = \text{abs}(Cv\_m - Ch\_m) \quad \text{(Eq. 28)}$$

Further, as shown in Eq. 29, a differential absolute value d_Cv between the differential absolute values d_Cv_c and d_Cv_m is compared with a threshold value THv.

$$\text{abs}(d\_Cv\_c - d\_Cv\_m) = d\_Cv \leq THv \quad \text{(Eq. 29)}$$

If the relation between the differential absolute value d_Cv and the threshold value THv satisfies Eq. 29, further judgment is made on whether Eq. 30 is satisfied or not.

$$Cv\_c < Cv\_m \quad \text{(Eq. 30)}$$

If Eq. 30 is satisfied, the correlation value Cv_c for color image is adopted as the judgment correlation value Cv. Specifically, Cv=Cv_c.

If Eq. 30 is not satisfied, the correlation value Cv_m for gray image is adopted as the judgment correlation value Cv. Specifically, Cv=Cv_m.

If the relation between the differential absolute value d_Cv and the threshold value THv satisfies Eq. 29, further judgment is made on whether Eq. 31 is satisfied or not.

$$Ch\_c < Ch\_m \quad \text{(Eq. 31)}$$

If Eq. 31 is satisfied, the correlation value Ch_c for color image is adopted as the judgment correlation value Ch. Specifically, Ch=Ch_c.

If Eq. 31 is not satisfied, the correlation value Ch_m for gray image is adopted as the judgment correlation value Ch. Specifically, Ch=Ch_m.

Thus, when the differential absolute value d_Cv is smaller than the threshold value THv, the difference between the differential absolute value d_Cv_c and the differential absolute value d_Cv_m is small. In other words, it is not assumed that either the vertical direction or the horizontal direction may have a strong correlation. In such a case, in each of the vertical direction and the horizontal direction, the correlation values for gray image and color image are compared with each other, and the smaller one, i.e., one having high correlation is selected.

If the relation between the differential absolute value d_Cv and the threshold value THv does not satisfy Eq. 29, further judgment is made on whether Eq. 32 is satisfied or not.

$$d\_Cv\_c > d\_Cv\_m \quad \text{(Eq. 32)}$$

If Eq. 32 is satisfied, the correlation values Cv_c and Ch_c for color image are adopted for correlation judgment. Specifically, Cv=Cv_c and Ch=Ch_c.

If Eq. 32 is not satisfied, the correlation values Cv_m and Ch_m for gray image are adopted for correlation judgment. Specifically, Cv=Cv_m and Ch=Ch_m.

Thus, when the differential absolute value d_Cv is larger than the threshold value THv, the difference between the differential absolute value d_Cv_c and d_Cv_m is large. In other words, it is assumed that either the vertical direction or the horizontal direction may have a strong correlation. In such a case, the differential absolute values d_Cv_c and d_Cv_m are compared with each other, and the correlation value for the image having the larger differential absolute value is selected.

Subsequently, as shown in Eq. 33, a differential absolute value d_Cdg_c between the correlation values $Cd_A\_c$ and $Cd_B\_c$ for color image is obtained.

$$d\_Cdg\_c = \text{abs}(Cd_A\_c - Cd_B\_c) \quad \text{(Eq. 33)}$$

Further, as shown in Eq. 34, a differential absolute value d_Cdg_m between the correlation values $Cd_A\_m$ and $Cd_B\_m$ for gray image is obtained.

$$d\_Cdg\_m = \text{abs}(Cd_A\_m - Cd_B\_m) \quad \text{(Eq. 34)}$$

Furthermore, as shown in Eq. 35, a differential absolute value d_Cdg between the differential absolute values d_Cdg_c and d_Cdg_m is compared with a threshold value THdg.

$$\text{abs}(d\_Cdg\_c - d\_Cdg\_m) = d\_Cdg \leq THdg \quad \text{(Eq. 35)}$$

If the relation between the differential absolute value d_Cdg and the threshold value THdg satisfies Eq. 35, further judgment is made on whether Eq. 36 is satisfied or not.

$$Cd_A\_c < Cd_A\_m \quad \text{(Eq. 36)}$$

If Eq. 36 is satisfied, the correlation value $Cd_A\_c$ for color image is adopted as the judgment correlation value $Cd_A$. Specifically, $Cd_A = Cd_A\_c$.

If Eq. 36 is not satisfied, the correlation value $Cd_A\_m$ for gray image is adopted as the judgment correlation value $Cd_A$. Specifically, $Cd_A = Cd_A\_m$.

If the relation between the differential absolute value d_Cdg and the threshold value THdg satisfies Eq. 35, further judgment is made on whether Eq. 37 is satisfied or not.

$$Cd_B\_c < Cd_B\_m \quad \text{(Eq. 37)}$$

If Eq. 37 is satisfied, the correlation value $Cd_B\_c$ for color image is adopted as the judgment correlation value $Cd_B$. Specifically, $Cd_B = Cd_B\_c$.

If Eq. 37 is not satisfied, the correlation value $Cd_B\_m$ for gray image is adopted as the judgment correlation value $Cd_B$. Specifically, $Cd_B = Cd_B\_m$.

Thus, when the differential absolute value d_Cdg is smaller than the threshold value THdg, the difference between the differential absolute value d_Cdg_c and d_Cdg_m is small. In other words, it is not assumed that either the diagonal A direction or the diagonal B direction may have a strong correlation. In such a case, in each of the diagonal A direction and the diagonal B direction, the correlation values for gray image and color image are compared with each other, and the smaller one, i.e., one having high correlation is selected.

If the relation between the differential absolute value d_Cdg and the threshold value THdg does not satisfy Eq. 35, further judgment is made on whether Eq. 38 is satisfied or not.

$$d\_Cdg\_c > d\_Cdg\_m \quad \text{(Eq. 38)}$$

If Eq. 38 is satisfied, the correlation values $Cd_A\_c$ and $Cd_B\_c$ for color image are adopted for correlation judgment. Specifically, $Cd_A = Cd_A\_c$ and $Cd_B = Cd_B\_c$ If Eq. 38 is not satisfied, the correlation values $Cd_A\_m$ and $Cd_B\_m$ for gray image are adopted for correlation judgment. Specifically, $Cd_A = Cd_A\_m$ and $Cd_B = Cd_B\_m$.

Thus, when the differential absolute value d_Cdg is larger than the threshold value THdg, the difference between the differential absolute value d_Cdg_c and d_Cdg_m is large. In other words, it is assumed that either the diagonal A direction or the diagonal B direction may have a strong correlation. In such a case, the differential absolute values d_Cdg_c and d_Cdg_m are compared with each other, and the correlation value for the image having the larger differential absolute value is selected.

In the case of (b) where $TH1 \geq K_L > TH2$, through the above operation, the judgment correlation values Cv, Ch, $Cd_A$ and $Cd_B$ are selected by overall judgment on the correlation values for gray image and color image.

The selection circuit 33 performs the above computation, to select the judgment correlation values Cv, Ch, $Cd_A$ and $Cd_B$ in each of the cases (a), (b) and (c).

Thus, in the first preferred embodiment, the combinations of the correlation judgment method and the pixel interpolation method are classified into three patterns from the relation among the chroma factor $K_L$ and the threshold values TH1 and TH2. Specifically, instead of providing one threshold value and making a judgment on whether the gray image or the color image, two threshold values TH1 and TH2 are provided and a boundary area between the gray image and the color image is thereby smoothed. Particularly, in an image existing near the boundary between a gray image and a color image, it thereby becomes possible to ease the visual unpleasantness after interpolation.

More specifically, the image existing near the boundary between a gray image and a color image has almost equal values of RGB components but there is a little variation in these values. Therefore, for judgment on correlation, paying attention to that the variation in RGB components is small, the correlation value is calculated by using pixels which are as near as possible without distinction of RGB. Alternatively, paying attention to that there is some variation in RGB components, the correlation value is calculated with distinction of RGB. Through overall judgment over such two ideas to select an optimum correlation value, the accuracy in judgment on the correlation direction is improved. In this case, if the variation in RGB components is disregarded and the image near the boundary is regarded as a gray image to perform pixel interpolation, there arises a possibility that false colors may occur. Then, as to pixel interpolation, a pixel interpolation process for color image is performed.

Further, in the first preferred embodiment, the chroma factor $K_L$ obtained by normalizing the chroma evaluation value L is used and the chroma factor $K_L$ and the threshold values TH1 and TH2 are compared with one another to judge whether a gray image or a color image. But, this is done for convenience in operation, and substantially, the chroma evaluation value L and the two threshold values are compared with one another, to judge whether a gray image or a color image. After selecting the correlation judgment method and the pixel interpolation method, the selection circuit 33 gives information on this selection to the first correlation judgment circuit 341 and the second correlation judgment circuit 342. The selection information includes information indicating whether the correlation judgment method and the pixel interpolation method are for gray image or color image and information indicating the selected judgment correlation values Cv, Ch, $Cd_A$ and $Cd_B$.

<6. Judgment on Correlation Direction of Each Pixel>

As discussed above, after selecting the judgment correlation values Cv, Ch, $Cd_A$ and $Cd_B$, the selection circuit 33 outputs the pixel signal and the selection information including the information on the judgment correlation values to the first correlation judgment circuit 341 and the second correlation judgment circuit 342. Specifically, the judgment correlation values Cv, Ch, $Cd_A$ and $Cd_B$ calculated by the selection circuit 33 are outputted to both the first correlation judgment circuit 341 and the second correlation judgment circuit 342 and the pixel signal inputted from the signal processing circuit 2 is also outputted to both the first correlation judgment circuit 341 and the second correlation judgment circuit 342. The first correlation judgment circuit 341 and the second correlation judgment circuit 342 are processing parts to judge the correlation with respect to the specified pixel on the basis of the judgment correlation values Cv, Ch, $Cd_A$ and $Cd_B$. The first correlation judgment circuit 341 judges the correlation direction, with the correlation with respect to the pixel signal evaluated highly. The second correlation judgment circuit 342 judges the correlation direction, with the correlation with respect to the pixel signal evaluated low, as compared with the first correlation judgment circuit 341.

FIG. 18 is a graph showing a correspondence of correlation values which the first correlation judgment circuit 341 uses for judgment on the correlation direction. The vertical axis represents the judgment correlation value Cv and the horizontal axis represents the judgment correlation value Ch.

When the relation between the judgment correlation value Cv and the judgment correlation value Ch is found in an area A1, the first correlation judgment circuit 341 judges that the correlation direction of the specified pixel is the horizontal direction. When the relation between the judgment correlation value Cv and the judgment correlation value Ch is found in an area A2, the first correlation judgment circuit 341 judges that the correlation direction of the specified pixel is the vertical direction. When the relation between the judgment correlation value Cv and the judgment correlation value Ch is found in an area A3, the first correlation judgment circuit 341 judges that there is no correlation of the specified pixel in any direction. When the relation between the judgment correlation value Cv and the judgment correlation value Ch is found in an area A4, the first correlation judgment circuit 341 judges that the correlation of the specified pixel is high in both the vertical and horizontal directions.

The first correlation judgment circuit 341 uses the correspondence view shown in FIG. 19, together with that of FIG. 18. The correspondence view of FIG. 19 shows a correspondence between the judgment correlation values $Cd_A$ and $Cd_B$ and the correlation direction. The vertical axis of FIG. 19 represents the judgment correlation value $Cd_A$ and the horizontal axis represents the judgment correlation value $Cd_B$. The area B1 is an area for judgment that the correlation direction is the diagonal B direction, and the area B2 is an area for judgment that the correlation direction is the diagonal A direction. Further, the area B3 is an area for judgment that there is no correlation in any direction, and the area B4 is an area for judgment that the correlation is high in both the diagonal A direction and the diagonal B direction.

The first correlation judgment circuit 341 compares the four judgment correlation values Cv, Ch, $Cd_A$ and $Cd_B$. Then, when the judgment correlation value Cv or the judgment correlation value Ch is smallest, the correspondence view of FIG. 18 is used. Then, the first correlation judgment circuit 341 determines the correlation direction, depending on which of the areas A1 to A4 where the correspondence of the judgment correlation values is found. On the other hand, when the judgment correlation value $Cd_A$ or the judgment correlation value $Cd_B$ is smallest, the correspondence view of FIG. 19 is used. Then, the first correlation judgment circuit 341 determines the correlation direction, depending on which of the areas B1 to B4 where the correspondence of the judgment correlation values is found.

After the correlation direction is determined, as discussed later, the first interpolation circuit 351 performs the pixel interpolation process by using the pixels in the correlation direction. Specifically, when the correspondence of the judgment correlation values is found in the area A1, the pixel interpolation is performed by using the pixels in the horizontal direction. When the correspondence of the judgment correlation values is found in the area A2, the pixel interpolation is performed by using the pixels in the vertical direction. When the correspondence of the judgment correlation values is found in the area B1, the pixel interpolation is performed by using the pixels in the diagonal B direction. When the correspondence of the judgment correlation values is found in the area B2, the pixel interpolation is performed by using the pixels in the diagonal A direction. Further, when the correspondence of the judgment correlation values is found in the area A3 or B3, for example, median interpolation is performed. When the correspondence of the judgment correlation values is found in the area A4 or B4, mean value interpolation is performed.

Figure 20:
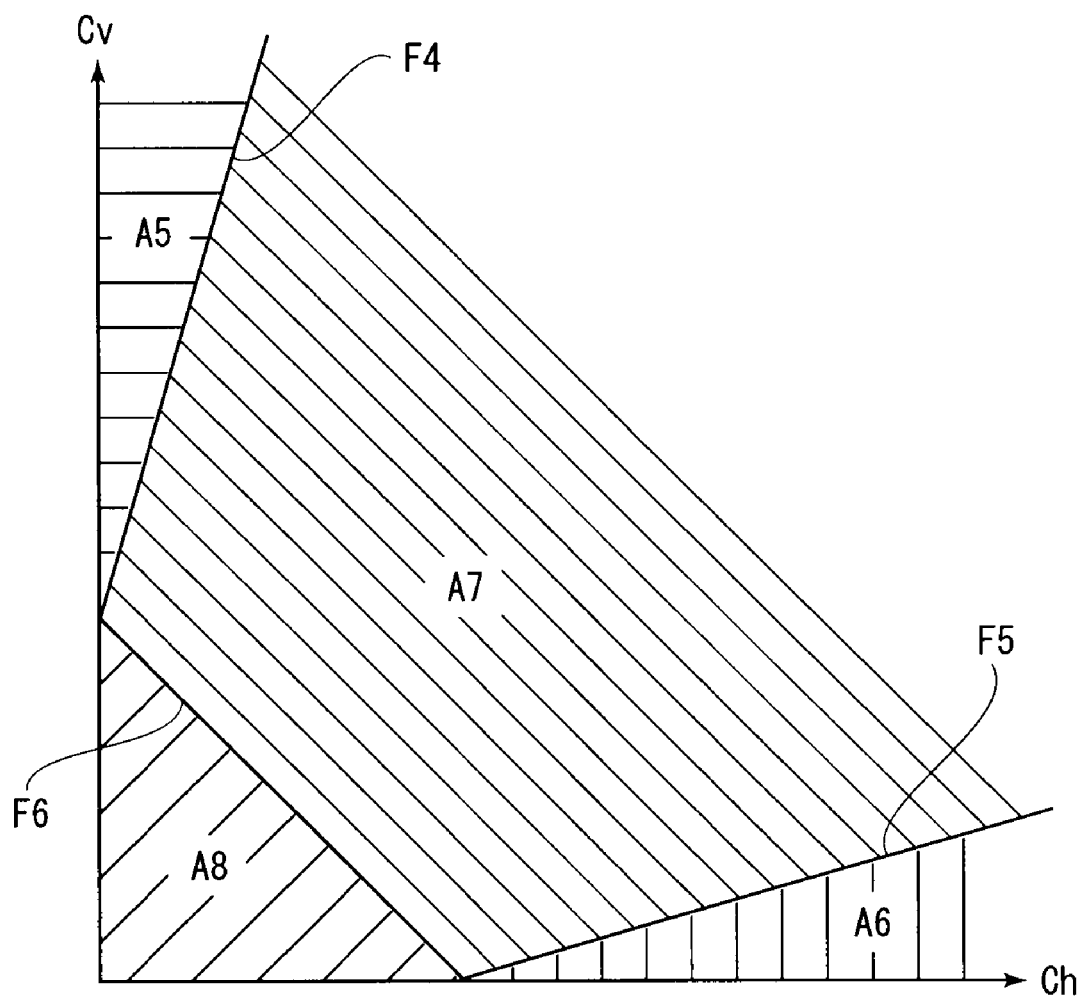
FIG. 20 is a graph showing a correspondence where the correlation is evaluated low in the vertical and horizontal directions.

On the other hand, FIG. 20 is a graph showing a correspondence of judgment correlation values which the second correlation judgment circuit 342 uses for judgment on the correlation direction. The vertical axis represents the judgment correlation value Cv and the horizontal axis represents the judgment correlation value Ch.

When the relation between the judgment correlation value Cv and the judgment correlation value Ch is found in an area A5, the second correlation judgment circuit 342 judges that the correlation direction of the specified pixel is the horizontal direction. When the relation between the judgment correlation value Cv and the judgment correlation value Ch is found in an area A6, the second correlation judgment circuit 342 judges that the correlation direction of the specified pixel is the vertical direction. When the relation between the judgment correlation value Cv and the judgment correlation value Ch is found in an area A7, the second correlation judgment circuit 342 judges that there is no correlation of the specified pixel in any direction. When the relation between the judgment correlation value Cv and the judgment correlation value Ch is found in an area A8, the second correlation judgment circuit 342 judges that the correlation of the specified pixel is high in both the vertical and horizontal directions.

Figure 21:
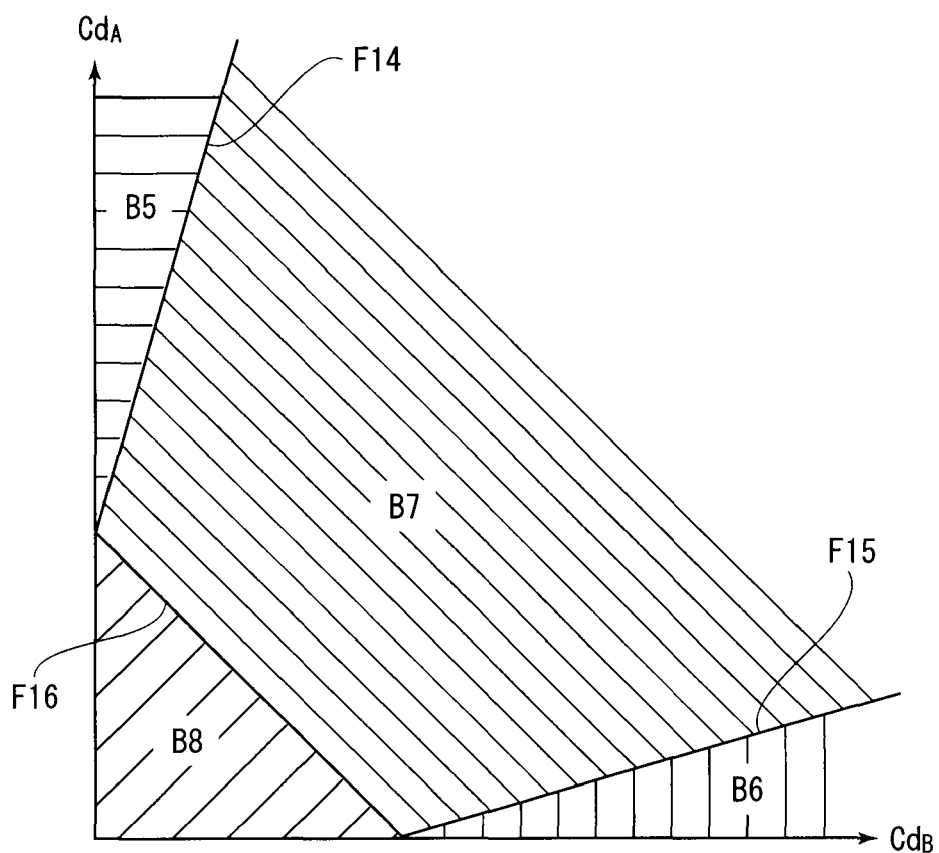
FIG. 21 is a graph showing a correspondence where the correlation is evaluated low in the diagonal A and diagonal B directions.

The second correlation judgment circuit 342 uses the correspondence view shown in FIG. 21, together with that of FIG. 20. The correspondence view of FIG. 21 shows a correspondence between the judgment correlation values $Cd_A$ and $Cd_B$ and the correlation direction. The vertical axis of FIG. 21 represents the judgment correlation value $Cd_A$ and the horizontal axis represents the judgment correlation value $Cd_B$. The area B5 is an area for judgment that the correlation direction is the diagonal B direction, and the area B6 is an area for judgment that the correlation direction is the diagonal A direction. Further, the area B7 is an area for judgment that there is no correlation in any direction, and the area B8 is an area for judgment that the correlation is high in both the diagonal A direction and the diagonal B direction.

The second correlation judgment circuit 342 compares the four judgment correlation values Cv, Ch, $Cd_A$ and $Cd_B$. Then, when the judgment correlation value Cv or the judgment correlation value Ch is smallest, the correspondence view of FIG. 20 is used. Then, the second correlation judgment circuit 342 determines the correlation direction, depending on which of the areas A5 to A8 where the correspondence of the judgment correlation values is found. On the other hand, when the judgment correlation value $Cd_A$ or the judgment correlation value $Cd_B$ is smallest, the correspondence view of FIG. 21 is used. Then, the second correlation judgment circuit 342 determines the correlation direction, depending on which of the areas B5 to B8 where the correspondence of the judgment correlation values is found.

After the correlation direction is determined, as discussed later, the second interpolation circuit 352 performs the pixel interpolation process by using the pixels in the correlation direction. Specifically, when the correspondence of the judgment correlation values is found in the area A5, the pixel interpolation is performed by using the pixels in the horizontal direction. When the correspondence of the judgment correlation values is found in the area A6, the pixel interpolation is performed by using the pixels in the vertical direction. When the correspondence of the judgment correlation values is found in the area B5, the pixel interpolation is performed by using the pixels in the diagonal B direction. When the correspondence of the judgment correlation values is found in the area B6, the pixel interpolation is performed by using the pixels in the diagonal A direction. Further, when the correspondence of the judgment correlation values is found in the area A7 or B7, for example, the median interpolation is performed. When the correspondence of the judgment correlation values is found in the area A8 or B8, the mean value interpolation is performed.

Thus, the first correlation judgment circuit 341 and the second correlation judgment circuit 342 determine the correlation direction by using the correspondence of the judgment correlation values shown in FIGS. 18 to 21. As a result, the first correlation judgment circuit 341 determines the correlation direction, with the correlation between the specified pixel and its surrounding pixels evaluated highly. In other words, the first correlation judgment circuit 341 actively uses the pixels in the correlation direction, to perform interpolation. On the other hand, the second correlation judgment circuit 342 determines the correlation direction, with the correlation between the specified pixel and its surrounding pixels evaluated low, as compared with the first correlation judgment circuit 341. In other words, the second interpolation circuit 352 is an interpolation circuit which actively adopts the median interpolation and the mean value interpolation.

Both the area A1 in FIG. 18 and the area A5 in FIG. 20 are areas where the correlation is judged to be high in the horizontal direction. As can be seen from the comparison between FIGS. 18 and 20, the inclination of the line F4 defining the area A5 is larger than that of the line F1 defining the area A1. Further, the value of intersection point between the line F4 and the vertical axis is larger than that between the line F1 and the vertical axis. In other words, when there is a relation that the judgment correlation value Ch is slightly smaller than the judgment correlation value Cv, the first correlation judgment circuit 341 actively adopts the relation to judge that the correlation in the horizontal direction is high. On the other hand, when there is a relation that the judgment correlation value Ch is sufficiently smaller than the judgment correlation value Cv, the second correlation judgment circuit 342 judges that the correlation in the horizontal direction is high.

Further, the inclination of the line F5 defining the area A6 is smaller than that of the line F2 defining the area A2. Furthermore, the value of intersection point between the line F5 and the horizontal axis is larger than that between the line F2 and the horizontal axis. In other words, when there is a relation that the judgment correlation value Cv is slightly smaller than the judgment correlation value Ch, the first correlation judgment circuit 341 actively adopts the relation to judge that the correlation in the vertical direction is high. On the other hand, when there is a relation that the judgment correlation value Cv is sufficiently smaller than the judgment correlation value Ch, the second correlation judgment circuit 342 judges that the correlation in the vertical direction is high.

As to the line F3 defining the areas A3 and A4 and the line F6 defining the areas A7 and A8, the relation shown in FIGS.

18 and 20 is only one example. In other words, though the values of intersection points between the line F6 and the axes are larger those between the line F3 and the axes, the relation between them is not limited to such a relation as above.

The relation between FIGS. 19 and 21 is the same as above. The inclination of the line F14 defining the area B5 is larger than that of the line F11 defining the area B1. Further, the value of intersection point between the line F14 and the vertical axis is larger than that between the line F11 and the vertical axis. When there is a relation that the judgment correlation value $Cd_B$ is slightly smaller than the judgment correlation value $Cd_A$, the first correlation judgment circuit 341 actively adopts the relation to judge that the correlation in the diagonal B direction is high. On the other hand, when there is a relation that the judgment correlation value $Cd_B$ is sufficiently smaller than the judgment correlation value $Cd_A$, the second correlation judgment circuit 342 judges that the correlation in the diagonal B direction is high.

Further, the inclination of the line F15 defining the area B6 is smaller than that of the line F12 defining the area B2. Furthermore, the value of intersection point between the line F15 and the horizontal axis is larger than that between the line F12 and the horizontal axis. In other words, when there is a relation that the judgment correlation value $Cd_A$ is slightly smaller than the judgment correlation value $Cd_B$, the first correlation judgment circuit 341 actively adopts the relation to judge that the correlation in the diagonal A direction is high. On the other hand, when there is a relation that the judgment correlation value $Cd_A$ is sufficiently smaller than the judgment correlation value $Cd_B$, the second correlation judgment circuit 342 judges that the correlation in the diagonal A direction is high.

As to the line F13 defining the areas B3 and B4 and the line F16 defining the areas B7 and B8, the relation shown in FIGS. 19 and 21 is only one example. In other words, though the values of intersection points between the line F16 and the axes are larger those between the line F13 and the axes, the relation between them is not limited to such a relation as above.

<7. Pixel Interpolation Process>

Now, discussion will be made on the pixel interpolation process performed by the first interpolation circuit 351 and the second interpolation circuit 352. The first interpolation circuit 351 and the second interpolation circuit 352, as discussed above, perform the pixel interpolation process on the correlation direction determined by the first correlation judgment circuit 341 and the second correlation judgment circuit 342. Then, the first interpolation circuit 351 and the second interpolation circuit 352 perform the pixel interpolation process for either gray image or color image on the basis of the selection information outputted from the selection circuit 33. Specifically, if the above-discussed pattern (c) is selected in the selection circuit 33, the pixel interpolation process for gray image is performed, and if the above pattern (a) or (b) is selected in the selection circuit 33, the pixel interpolation process for color image is performed (see <5. Selection of Correlation Judgment Method and Pixel Interpolation Method>.

(7-1) Pixel Interpolation for Gray Image

If the above-discussed pattern (c) is selected in the selection circuit 33, the pixel interpolation process for gray image is performed on the correlation direction determined in the first correlation judgment circuit 341 and the second correlation judgment circuit 342. In the pixel interpolation for gray image, without distinction of the color component of the specified pixel among R, G and B, the pixel interpolation process is performed by using the pixels existing in the determined correlation direction. In other words, without consideration of what color component among R, G and B the specified pixel is and what color component among R, G and B its surrounding pixels are, the specified pixel is interpolated by using its surrounding pixels.

Specifically, if the correlation value is judged to be high in the vertical direction, in other words, if the first correlation judgment circuit 341 judges that the correlation direction belongs to the area A2, the first interpolation circuit 351 performs the pixel interpolation process by using Eq. 39. Alternatively, if the second correlation judgment circuit 342 judges that the correlation direction belongs to the area A6, the second interpolation circuit 352 performs the pixel interpolation process by using Eq. 39.

$$S_{Out} = \frac{P12 + 2 \times P22 + P32}{4} \quad \text{(Eq. 39)}$$

Further, if the correlation value is judged to be high in the horizontal direction, in other words, if the first correlation judgment circuit 341 judges that the correlation direction belongs to the area A1, the first interpolation circuit 351 performs the pixel interpolation process by using Eq. 40. Alternatively, if the second correlation judgment circuit 342 judges that the correlation direction belongs to the area A5, the second interpolation circuit 352 performs the pixel interpolation process by using Eq. 40.

$$S_{Out} = \frac{P21 + 2 \times P22 + P23}{4} \quad \text{(Eq. 40)}$$

Furthermore, if the correlation value is judged to be high in the diagonal A direction, in other words, if the first correlation judgment circuit 341 judges that the correlation direction belongs to the area B2, the first interpolation circuit 351 performs the pixel interpolation process by using Eq. 41. Alternatively, if the second correlation judgment circuit 342 judges that the correlation direction belongs to the area B6, the second interpolation circuit 352 performs the pixel interpolation process by using Eq. 41.

$$S_{Out} = \frac{P11 + 2 \times P22 + P33}{4} \quad \text{(Eq. 41)}$$

Still further, if the correlation value is judged to be high in the diagonal B direction, in other words, if the first correlation judgment circuit 341 judges that the correlation direction belongs to the area B1, the first interpolation circuit 351 performs the pixel interpolation process by using Eq. 42. Alternatively, if the second correlation judgment circuit 342 judges that the correlation direction belongs to the area B5, the second interpolation circuit 352 performs the pixel interpolation process by using Eq. 42.

$$S_{Out} = \frac{P13 + 2 \times P22 + P31}{4} \quad \text{(Eq. 42)}$$

In Eqs. 39 to 42, the term of P22 is multiplied by the coefficient of "2" and this is for weighting in accordance with the distance from the specified pixel. Further, if it is judged that the correlation is high in all the directions (the area A4, B4, A8 or B8), for example, the mean value interpolation is performed. If it is judged that there is no correlation in any direction (the area A3, B3, A7 or B7), for example, the median interpolation is performed.

(7-2) Pixel Interpolation for Color Image

If the above-discussed pattern (a) or (b) is selected in the selection circuit 33, the first interpolation circuit 351 and the second interpolation circuit 352 perform the pixel interpolation process for color image on the correlation direction determined in the first correlation judgment circuit 341 and the second correlation judgment circuit 342. In the pixel interpolation for color image, an interpolation computation method changes depending on the color component of the specified pixel among R, G and B. Specifically, the pixel interpolation process is performed by using the pixels which exist in the correlation direction determined by the first correlation judgment circuit 341 and the second correlation judgment circuit 342 and have the same color as the color of the pixel to be interpolated.

For example, if the specified pixel is a G pixel and the correlation in the vertical direction is judged to be high (the area A2 or A6), the R component and the B component of the specified pixel are interpolated by using the R pixels and the B pixels existing in the vertical direction. Further, if the specified pixel is a G pixel and the correlation in the horizontal direction is judged to be high (the area A1 or A5), the B component and the R component of the specified pixel are interpolated by using the B pixels and the R pixels existing in the horizontal direction.

If the specified pixel is a G pixel and the correlation in the diagonal A direction is judged to be high (the area B2 or B6), the R component and the B component of the specified pixel are interpolated by using the R pixels and the B pixels existing in the diagonal A direction. Further, if the specified pixel is a G pixel and the correlation in the diagonal B direction is judged to be high (the area B1 or B5), the B component and the R component of the specified pixel are interpolated by using the B pixels and the R pixels existing in the diagonal B direction.

If there is a pixel having the color component to be interpolated on the line in a direction for interpolation, the pixel interpolation process can be performed by calculating an average value of the pixels having the same color which exist on the line or performing linear interpolation. Depending on the pixel array, however, there is sometimes no pixel having the color component to be interpolated on the line in the direction for the interpolation. In such a case, a method in which a pixel value of the pixel to be interpolated is estimated from the rate of pixel change (Laplacian) in a direction orthogonal to the line in the direction for the interpolation may be used.

Thus, the pixel interpolation process for color image is performed by using the pixels existing in the correlation direction, which have the same color as the color of the pixel to be interpolated, to interpolate the specified pixel. Alternatively, if there is no pixel having the same color as the color of the pixel to be interpolated in the correlation direction, interpolation is performed on the specified pixel by using the estimated value as a pixel value of the pixel having the same color in the correlation direction.

As discussed above, the image processing circuit 3 of the first preferred embodiment obtains the chroma evaluation value L of the matrix area and selects the correlation judgment method and the pixel interpolation method on the specified pixel in the matrix area on the basis of the chroma evaluation value L. Then, for judging whether the process for gray image or for color image on the basis of the chroma evaluation value L, the two threshold values TH1 and TH2 are used. For the area existing at the boundary between a gray image and a color image, the correlation direction is judged by using the correlation value selected by overall judgment on the correlation values for gray image and color image, and by using the pixel interpolation method for color image, it is possible to reduce false colors and improve the sense of resolution.

<8. Color Space Conversion Process>

After performing the pixel interpolation process on each pixel, the first interpolation circuit 351 outputs a complete pixel signal after interpolation to the first color space conversion circuit 361. In other words, as to the signal inputted to the first color space conversion circuit 361, each pixel includes signals for all the color components of RGB. Further, after performing the pixel interpolation process on each pixel, the second interpolation circuit 352 outputs a complete pixel signal after interpolation to the second color space conversion circuit 362. In other words, as to the signal inputted to the second color space conversion circuit 362, each pixel includes signals for all the color components of RGB.

Then, the first color space conversion circuit 361 generates a luminance signal (Y signal) from the pixel signal of RGB for each pixel. On the other hand, the second color space conversion circuit 362 generates color difference signals (Cb and Cr signals) from the pixel signal of RGB for each pixel. Thus, the RGB signal of Bayer array outputted from the image pickup element 1 is converted into the luminance signal (Y signal) and the color difference signals (Cb and Cr signals).

As discussed above, the luminance signal outputted from the first color space conversion circuit 361 is a signal generated from the RGB signal which is interpolated by the first interpolation circuit 351. The RGB signal interpolated by the first interpolation circuit 351 is a signal which is subjected to the pixel interpolation with the correlation evaluated highly, i.e., a signal maintaining high resolution. It is thereby possible to keep the sense of resolution of the generated YUV signal high.

On the other hand, the color difference signals outputted from the second color space conversion circuit 362 are signals generated from the RGB signal which is interpolated by the second interpolation circuit 352. The RGB signal interpolated by the second interpolation circuit 352 is a signal which is subjected to the pixel interpolation with the correlation evaluated relatively low, i.e., a signal whose noise is suppressed. In other words, this is a signal to which an LPF (Low Pass Filter) is applied. It is thereby possible to suppress the noise of the generated YUV signal even if a RAW image having high noise is outputted from the image pickup element 1.

The luminance signal (Y signal) outputted from the first color space conversion circuit 361 and the color difference signals (Cb and Cr signals) outputted from the second color space conversion circuit 362 are stored into the memory 5.

The Second Preferred Embodiment

Figure 22:
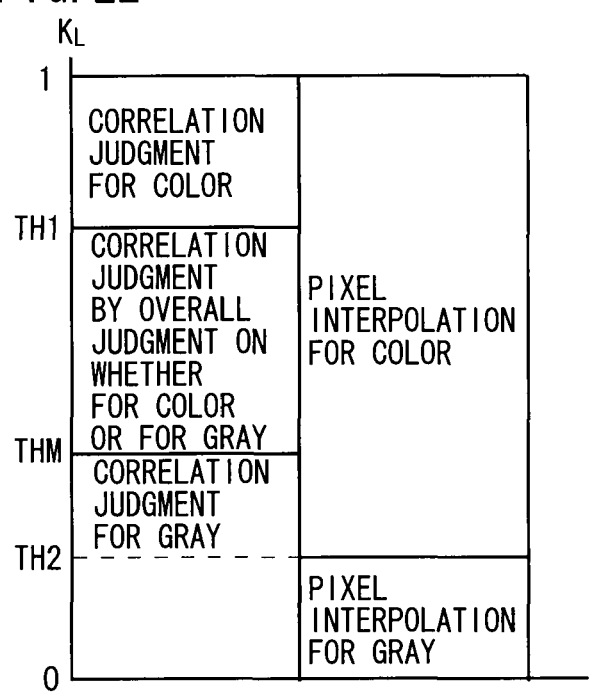
FIG. 22 is a view showing a criterion of judgment on a correlation judgment method and a pixel interpolation method in a second preferred embodiment.

FIG. 22 is a view showing a criterion of judgment on the correlation judgment method and the pixel interpolation method in the second preferred embodiment. In the first preferred embodiment, as shown in FIG. 17, the selection circuit 33 selects the correlation judgment method and the pixel interpolation method by using the two threshold values TH1 and TH2. In the second preferred embodiment, as shown in FIG. 22, the selection circuit 33 selects the correlation judgment method and the pixel interpolation method by using three threshold values TH1, THM and TH2 (TH1≧THM≧TH2), as discussed below.

(a') $K_L$>TH1 correlation judgment method: the correlation direction is judged by using the correlation value for color image.

pixel interpolation method: the pixel interpolation method for color image is used.

(b') TH1$\geq K_L$>THM correlation judgment method: the correlation direction is judged by using the correlation value selected by overall judgment on the correlation values for color image and gray image.

pixel interpolation method: the pixel interpolation method for color image is used.

(b") THM$\geq K_L$>TH2 correlation judgment method: the correlation direction is judged by using the correlation value for gray image.

pixel interpolation method: the pixel interpolation method for color image is used.

(c) TH2$\geq K_L$ correlation judgment method: the correlation direction is judged by using the correlation value for gray image.

pixel interpolation method: the pixel interpolation method for gray image is used.

Thus, the selection circuit 33 uses the three threshold values to select the correlation judgment method and the pixel interpolation method in four patterns. The pattern (b) in the first preferred embodiment is further classified into two patterns (b') and (b"). The pattern (b') is the same as the pattern (b) in the first preferred embodiment. With the pattern (b"), on the area closer to a gray area, it becomes possible to judge the correlation direction with high precision through correlation judgment without distinction of RGB. This threshold value THM may be set freely from the threshold value TH2 to the threshold value TH1. The case of the first preferred embodiment is a case where the threshold values THM and TH2 coincide with each other.

While the invention has been shown and described in detail, the foregoing description is in all aspects illustrative and not restrictive. It is therefore understood that numerous modifications and variations can be devised without departing from the scope of the invention.

What is claimed is:

1. A pixel interpolation method comprising the steps of:
   (a) inputting a pixel signal of a predetermined color space;
   (b) calculating a chroma evaluation value of an area consisting of a specified pixel and its surrounding pixels;
   (c) selecting a correlation judgment method and a pixel interpolation method on said specified pixel on the basis of said chroma evaluation value; and
   (d) performing a pixel interpolation process on said specified pixel in a correlation direction determined by the selected correlation judgment method, by using the selected pixel interpolation method,
   wherein by using predetermined two threshold values TH1 and TH2 (TH1$\geq$TH2), if said chroma evaluation value is not larger than the threshold value TH2, a correlation judgment method for gray image and a pixel interpolation method for gray image are selected, if said chroma evaluation value is larger than the threshold value TH2 and not larger than the threshold value TH1, a correlation judgment method using a correlation value selected out of correlation values for gray image and color image and a pixel interpolation method for color image are selected, and if said chroma evaluation value is larger than the threshold value TH1, a correlation judgment method for color image and a pixel interpolation method for color image are selected in said step (c).

2. The pixel interpolation method according to claim 1, wherein
   said step (c) includes the step of
   (c-1) selecting a correlation judgment method using a correlation value out of correlation values for gray image and color image, which is judged that the correlation on said specified pixel is reflected higher on, if said chroma evaluation value is larger than the threshold value TH2 and not larger than the threshold value TH1.

3. The pixel interpolation method according to claim 2, wherein
   in a first direction and a second direction which are orthogonal to each other, a differential absolute value A1 between a correlation value for gray image in the first direction and a correlation value for gray image in the second direction and a differential absolute value A2 between a correlation value for color image in the first direction and a correlation value for color image in the second direction are calculated and if a differential absolute value A3 between the differential absolute value A1 and the differential absolute value A2 is not larger than a predetermined threshold value THA, a correlation value out of the correlation values for gray image and color image, whose correlation is higher, is used in the first direction and the second direction in said step (c-1).

4. The pixel interpolation method according to claim 3, wherein
   said first direction is a vertical direction and said second direction is a horizontal direction.

5. The pixel interpolation method according to claim 3, wherein
   said first direction is a direction having the inclination of 45 degrees with respect to the horizontal direction.

6. The pixel interpolation method according to claim 2, wherein
   in a first direction and a second direction which are orthogonal to each other, a differential absolute value A1 between a correlation value for gray image in the first direction and a correlation value for gray image in the second direction and a differential absolute value A2 between a correlation value for color image in the first direction and a correlation value for color image in the second direction are calculated and if a differential absolute value A3 between the differential absolute value A1 and the differential absolute value A2 is larger than a predetermined threshold value THA, a correlation value for gray image is used in the first direction and the second direction when the differential absolute value A1 is larger than the differential absolute value A2 and a correlation value for color image is used in the first direction and the second direction when the differential absolute value A2 is larger than the differential absolute value A1 in said step (c-1).

7. The pixel interpolation method according to claim 6, wherein
   said first direction is a vertical direction and said second direction is a horizontal direction.

8. The pixel interpolation method according to claim 6, wherein
   said first direction is a direction having the inclination of 45 degrees with respect to the horizontal direction.

9. The pixel interpolation method according to claim 1, wherein
   said step (b) comprises the steps of:
   (b-1) calculating a first color difference component evaluation value from a color difference component value on the basis of respective average pixel values for color components by using said specified pixel and said surrounding pixels;

(b-2) calculating a second color difference component evaluation value by accumulating color difference component values in a predetermined direction by using said specified pixel and said surrounding pixels; and (b-3) comparing said first color difference component evaluation value and said second color difference component evaluation value to select one whose level of color difference component is smaller as said chroma evaluation value.

10. The pixel interpolation method according to claim 9, wherein
said step (b-2) comprises the steps of:
(b-2-1) calculating a vertical color difference component evaluation value by accumulating color difference component values in a vertical direction by using said specified pixel and said surrounding pixels; and
(b-2-2) calculating a horizontal color difference component evaluation value by accumulating color difference component values in a horizontal direction by using said specified pixel and said surrounding pixels,
said step (b-3) comprises the step of:
(b-3-1) comparing said first color difference component evaluation value, said vertical color difference component evaluation value and said horizontal color difference component evaluation value to select one whose level of color difference component is smallest as said chroma evaluation value.

11. A pixel interpolation method comprising the steps of:
(a) inputting a pixel signal of a predetermined color space;
(b) calculating a chroma evaluation value of an area consisting of a specified pixel and its surrounding pixels;
(c) selecting a correlation judgment method and a pixel interpolation method on said specified pixel on the basis of said chroma evaluation value; and
(d) performing a pixel interpolation process on said specified pixel in a correlation direction determined by the selected correlation judgment method, by using the selected pixel interpolation method,
wherein by using predetermined three threshold values TH1, THM and TH2 (TH1≧THM≧TH2), if said chroma evaluation value is not larger than the threshold value TH2, a correlation judgment method for gray image and a pixel interpolation method for gray image are selected, if said chroma evaluation value is larger than the threshold value TH2 and not larger than the threshold value THM, a correlation judgment method for gray image and a pixel interpolation method for color image are selected, if said chroma evaluation value is larger than the threshold value THM and not larger than the threshold value TH1, a correlation judgment method using a correlation value selected out of correlation values for gray image and color image and a pixel interpolation method for color image are selected, and if said chroma evaluation value is larger than the threshold value TH1, a correlation judgment method for color image and a pixel interpolation method for color image are selected in said step (c).

12. The pixel interpolation method according to claim 11, wherein
said step (c) includes the step of
(c-1) selecting a correlation judgment method using a correlation value out of correlation values for gray image and color image, which is judged that the correlation on said specified pixel is reflected higher on, if said chroma evaluation value is larger than the threshold value THM and not larger than the threshold value TH1.

13. The pixel interpolation method according to claim 12, wherein
in a first direction and a second direction which are orthogonal to each other, a differential absolute value A1 between a correlation value for gray image in the first direction and a correlation value for gray image in the second direction and a differential absolute value A2 between a correlation value for color image in the first direction and a correlation value for color image in the second direction are calculated and if a differential absolute value A3 between the differential absolute value A1 and the differential absolute value A2 is not larger than a predetermined threshold value THA, a correlation value out of the correlation values for gray image and color image, whose correlation is higher, is used in the first direction and the second direction in said step (c-1).

14. The pixel interpolation method according to claim 13, wherein
said first direction is a vertical direction and said second direction is a horizontal direction.

15. The pixel interpolation method according to claim 13, wherein
said first direction is a direction having the inclination of 45 degrees with respect to the horizontal direction.

16. The pixel interpolation method according to claim 12, wherein
in a first direction and a second direction which are orthogonal to each other, a differential absolute value A1 between a correlation value for gray image in the first direction and a correlation value for gray image in the second direction and a differential absolute value A2 between a correlation value for color image in the first direction and a correlation value for color image in the second direction are calculated and if a differential absolute value A3 between the differential absolute value A1 and the differential absolute value A2 is larger than a predetermined threshold value THA, a correlation value for gray image is used in the first direction and the second direction when the differential absolute value A1 is larger than the differential absolute value A2 and a correlation value for color image is used in the first direction and the second direction when the differential absolute value A2 is larger than the differential absolute value A1 in said step (c-1).

17. The pixel interpolation method according to claim 16, wherein
said first direction is a vertical direction and said second direction is a horizontal direction.

18. The pixel interpolation method according to claim 16, wherein
said first direction is a direction having the inclination of 45 degrees with respect to the horizontal direction.

19. The pixel interpolation method according to claim 11, wherein
said step (b) comprises the steps of:
(b-1) calculating a first color difference component evaluation value from a color difference component value on the basis of respective average pixel values for color components by using said specified pixel and said surrounding pixels;
(b-2) calculating a second color difference component evaluation value by accumulating color difference component values in a predetermined direction by using said specified pixel and said surrounding pixels; and (b-3) comparing said first color difference component evaluation value and said second color difference component evaluation value to select one whose level of color difference component is smaller as said chroma evaluation value.

20. The pixel interpolation method according to claim 19, wherein said step (b-2) comprises the steps of:

(b-2-1) calculating a vertical color difference component evaluation value by accumulating color difference component values in a vertical direction by using said specified pixel and said surrounding pixels; and (b-2-2) calculating a horizontal color difference component evaluation value by accumulating color difference component values in a horizontal direction by using said specified pixel and said surrounding pixels, said step (b-3) comprises the step of:

(b-3-1) comparing said first color difference component evaluation value, said vertical color difference component evaluation value and said horizontal color difference component evaluation value to select one whose level of color difference component is smallest as said chroma evaluation value.

* * * * *